US009898472B2

(12) United States Patent
Ozawa et al.

(10) Patent No.: US 9,898,472 B2
(45) Date of Patent: Feb. 20, 2018

(54) JOB EXECUTION DEVICE, NON-TRANSITORY COMPUTER-READABLE RECORDING MEDIUM AND DATA DELETION METHOD

(71) Applicant: Konica Minolta, Inc., Tokyo (JP)

(72) Inventors: Tomohiro Ozawa, Tokyo (JP); Jun Shiraishi, Aichi (JP); Masaki Shimazaki, Saitama (JP)

(73) Assignee: Konica Minolta, Inc., Tokyo (JP)

( * ) Notice: Subject to any disclaimer, the term of this patent is extended or adjusted under 35 U.S.C. 154(b) by 356 days.

(21) Appl. No.: 14/720,145

(22) Filed: May 22, 2015

(65) Prior Publication Data

US 2015/0363417 A1  Dec. 17, 2015

(30) Foreign Application Priority Data

Jun. 12, 2014 (JP) ................................. 2014-121667

(51) Int. Cl.
 *G06F 17/30* (2006.01)
(52) U.S. Cl.
 CPC ............................... *G06F 17/30082* (2013.01)
(58) Field of Classification Search
 None
 See application file for complete search history.

(56) References Cited

U.S. PATENT DOCUMENTS

| | | | |
|---|---|---|---|
| 2002/0124130 A1* | 9/2002 | Iida | G06F 3/0607 711/103 |
| 2008/0172427 A1* | 7/2008 | Ito | G06F 12/0246 |
| 2010/0228802 A1* | 9/2010 | Bryant-Rich | G06F 17/30117 707/828 |
| 2011/0161386 A1* | 6/2011 | Ito | G06F 3/0616 707/824 |

FOREIGN PATENT DOCUMENTS

| | | |
|---|---|---|
| JP | 2004-072139 A | 3/2004 |
| JP | 2004-357078 A | 12/2004 |
| JP | 2006-155159 A | 6/2006 |
| JP | 2007-249071 A | 9/2007 |
| JP | 2007-265492 A | 10/2007 |
| JP | 2008-042805 A | 2/2008 |

OTHER PUBLICATIONS

Office Action issued in corresponding Japanese Application No. 2014-121667 dated Oct. 6, 2016, and English translation thereof (12 pages).

* cited by examiner

*Primary Examiner* — Anh Tai Tran
(74) *Attorney, Agent, or Firm* — Osha Liang LLP

(57) ABSTRACT

A job execution device includes: a storing unit; a file system that divides a storing area of the storing unit into a plurality of division areas, and manages the storing area of the storing unit; a management table in which deletion management information indicating whether an overwrite deletion is necessary is registered for each of the division areas; a deletion processing unit; a job execution unit; and a management table updating unit. When the file system receives the releasing request, the file system changes the division area management information for the division areas to be released by the releasing request so as to change the status to "unused" before the deletion management information for all of the division areas to be released by the releasing request is changed to a non-necessity of the overwrite deletion.

17 Claims, 16 Drawing Sheets

FIG.7

| STATUS AT THE UPDATING | DELETION MANAGEMENT INFORMATION N | DELETION MANAGEMENT INFORMATION M |
|---|---|---|
| FAT 1 | NO CHANGE | NECESSITY (M)→ UNNECESSITY (N) |
| FAT 0 | UNNECESSITY (N) → NECESSITY (M) | NO CHANGE |

FAT
(AT THE RESTARTING OF
OVERWRITE DELETION)

MANAGEMENT TABLE

100

101

| | | | | |
|---|---|---|---|---|
| 0 | 0 | 0 | 0 | 0 |
| 0 | 0 | 0 | 0 | 0 |
| 1 | 1 | 1 | 1 | 1 |
| 1 | 1 | 1 | 1 | 1 |
| 1 | 1 | 0 | 0 | 0 |
| 0 | 0 | 0 | 0 | 0 |
| 0 | 1 | 1 | 0 | 0 |
| 0 | 0 | 0 | 0 | 0 |
| 0 | 0 | 0 | 0 | 0 |
| 0 | 0 | 0 | 0 | 0 |

IN CASE OF 0,
CHANGE DELETION
MANAGEMENT
INFORMATION TO
"M"

UPDATE CHANGED
PORTIONS

IN CASE OF 1,
CHANGE
DELETION
MANAGEMENT
INFORMATION TO
"N"

| | | | | |
|---|---|---|---|---|
| M | M | M | M | M |
| M | M | M | M | M |
| N | N | N | N | N |
| N | N | N | N | N |
| N | N | M | M | M |
| M | M | M | M | M |
| M | N | N | M | M |
| M | M | M | M | M |
| M | M | M | M | M |
| M | M | M | M | M |

| N | N | N | M | M |
|---|---|---|---|---|
| M | S<br>M | D<br>M | D<br>M | D<br>M |
|   | ← 2nd → | | | |
| M | M | M | M | M |
| M | M | N | N | N |
| N | N | N | N | N |
| M | M | M | M | M |
| F<br>M | T<br>M | T<br>M | T<br>M | T<br>M |
| ← 1st → | | | | |
| N | N | N | N | N |
| M | M | M | M | M |
| M | M | M | M | M |

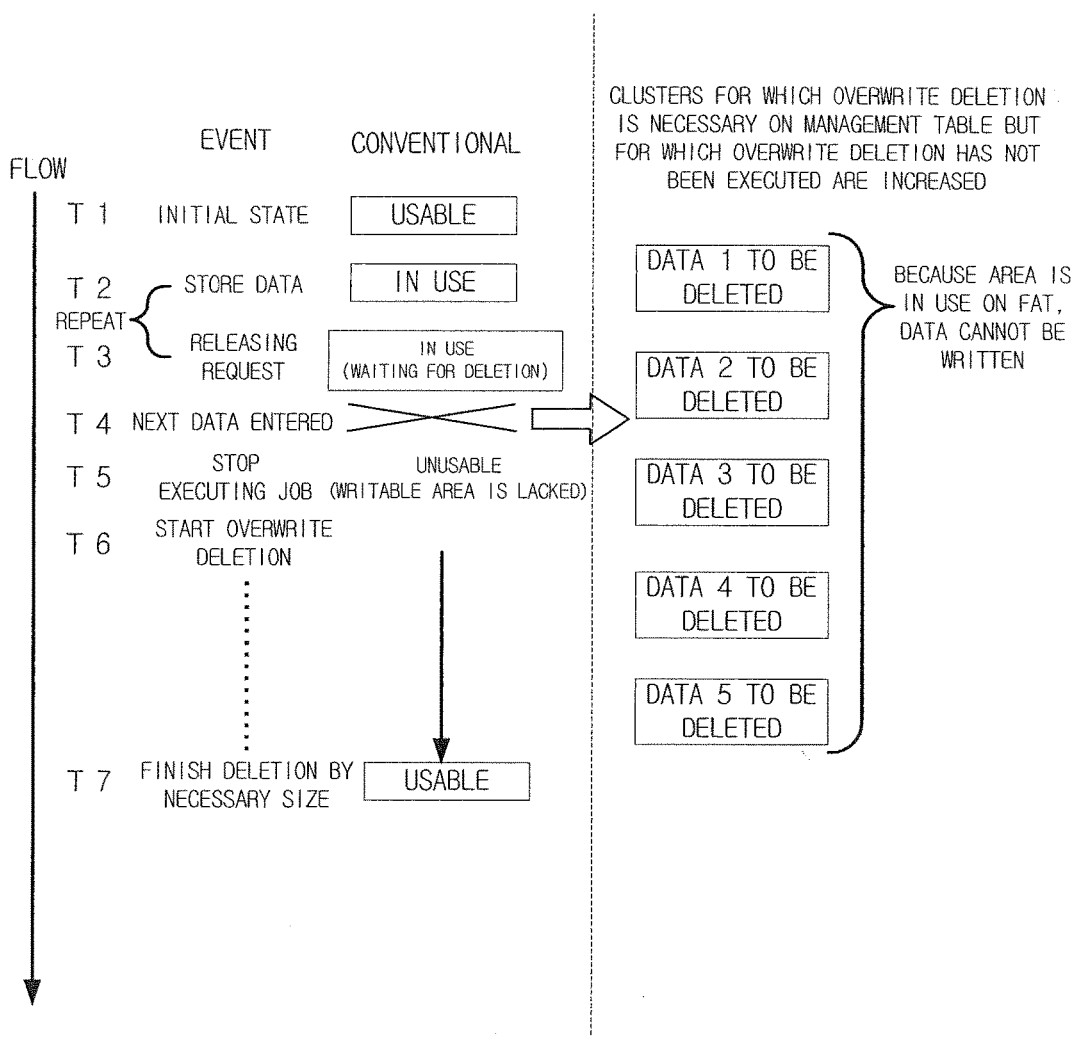

JOB EXECUTION DEVICE, NON-TRANSITORY COMPUTER-READABLE RECORDING MEDIUM AND DATA DELETION METHOD

CROSS-REFERENCE TO RELATED APPLICATIONS

The present U.S. patent application claims priority to Japanese Patent Application No. 2014-121667, filed on Jun. 12, 2014, according to the Paris Convention, the entirety of which is incorporated herein by reference.

BACKGROUND OF THE INVENTION

Field of the Invention

The present invention relates to a job execution device, a non-transitory computer-readable recording medium and a data deletion method which can delete data stored in a storing area so as to be unreadable.

Description of Related Art

In the data deletion executed by using a standard deletion command in an operation system, only the information of the data to be deleted on the management information is deleted. The entity of the data (actual data) is not deleted from a storing medium. Therefore, even though the information of the data does not exist on the management information, the actual data remains in the storing medium. This raises concerns, for example, relating to confidentiality of the information.

In order to delete the information in compliance with the ISO (International Organization for Standardization) standard, it is necessary to overwrite the meaningless data on the actual data which does not exist on the management information but remains in the storing medium, and to make the actual data unreadable. Hereinafter, the process for overwriting the meaningless data is referred to as the overwrite deletion.

As an example for executing the overwrite deletion, for example, in Japanese Patent Application Publication No. 2008-42805, the management table in which the deletion management information for indicating whether the overwrite deletion is necessary for each cluster of the storing unit is registered is provided so as to be separated from FAT (File Allocation Table). In the overwrite deletion process, the overwrite deletion is sequentially executed for the clusters for which the overwrite deletion is necessary, by referring to the management table.

When the releasing request for releasing the area by the standard deletion command or the deletion operation is received from an application program, the deletion management information for the clusters included in the area to be released by the above request is updated on the management table so as to change the information to the necessity of the overwrite deletion. Further, in the FAT, the information is updated so as to change the status of the above clusters to "unused". Then, in case that the overwrite deletion is executed by referring to the management table, the following trouble is caused. That is, in case that before the overwrite deletion is executed, a new data is written by the application program in the clusters of which the status is set to "unused" on the FAT and for which the deletion management information indicates that the overwrite deletion is necessary on the management table, the overwrite deletion is executed for the new data which is written by the application program.

In another method, when the request for releasing the area is received, the application program is prevented from being executed until the overwrite deletion for all of the clusters to be released by the request is finished. However, in this method, the application program cannot be smoothly executed.

In Japanese Patent Application Publication No. 2008-42805, the execution of the application program is secured. That is, in Japanese Patent Application Publication No. 2008-42805, after the overwrite deletion which is executed in the overwrite deletion process is finished, in the FAT, the information is updated so as to change the status of all of the clusters released by the request to "unused". As a result, even though the overwrite deletion process is interrupted and the application program is preferentially executed, it is possible to prevent a new data from being written in the clusters for which the overwrite deletion is necessary, before the overwrite deletion is executed.

However, in Japanese Patent Application Publication No. 2008-42805, until the overwrite deletion is finished, the clusters for which the overwrite deletion is necessary are in use on the FAT. Therefore, until the overwrite deletion is finished, a new data cannot be written in the clusters for which the overwrite deletion is necessary. As a result, it is not possible to effectively use the storing medium as a storing resource.

For example, in an MFP (Multifunction Peripheral) which is frequently used, jobs, such as a copy job for writing a file and deleting the written file, and the like, are frequently received. At this time, because the job is executed preferentially over the overwrite deletion process, the clusters for which the overwrite deletion is necessary but for which the overwrite deletion has not been executed (the clusters which are in use on the FAT) are continuously increased. As a result, the storing resource is oppressed, and there is some possibility that the storing area in which a new data can be written (the clusters which are unused on the FAT) is insufficient.

FIG. 16 shows an example of the case in which the storing area in which a new data can be written is insufficient. In the initial state, the storing area which can be used is secured (T1). Next, the new data is written and the storing area is used (T2). Then, the request for releasing the area is received and in the management table, the deletion management information for the clusters to be released by the request is changed to the necessity of the overwrite deletion (T3). At T3, the clusters to be released by the request are still in use on the FAT.

Then, the steps T2 and T3 are repeated without starting the overwrite deletion. Thereby, the clusters for which the overwrite deletion is necessary but for which the overwrite deletion has not been executed (the clusters which are in use on the FAT) are continuously increased. When the storing area in which the new data can be written (the clusters which are unused on the FAT) does not exist (T4), the execution of the job for writing the new data is stopped (T5).

Then, the overwrite deletion is started (T6), and when the storing area which can be used is secured by the area size necessary for the execution of the job (T7), the stopped job is restarted. As described above, the clusters for which the overwrite deletion is necessary but for which the overwrite deletion has not been executed are increased, and when the job cannot be executed, the job must be stopped until the execution of the overwrite deletion is finished.

SUMMARY

In general, an image forming apparatus reflecting one aspect of the present invention may comprise:

a storing unit;

a file system configured to divide a storing area of the storing unit into a plurality of division areas, and to manage the storing area of the storing unit by using a file allocation table in which division area management information indicating a status of each of the division areas is registered, the status indicating that each division area is in use or unused;

a management table in which deletion management information indicating whether an overwrite deletion is necessary is registered for each of the division areas;

a deletion processing unit configured to sequentially execute the overwrite deletion for the division areas for which the deletion management information indicates that the overwrite deletion is necessary, and to change the deletion management information for the division areas for which the overwrite deletion is finished, to a non-necessity of the overwrite deletion;

a job execution unit configured to request the file system to use the storing unit, and to execute a job by using the division areas assigned by the file system; and a management table updating unit configured to change the deletion management information for the division areas for which the division area management information is changed so as to change the status to "in use" by the file system, to the non-necessity of the overwrite deletion, and to change the deletion management information for the division areas to be released by a releasing request, to a necessity of the overwrite deletion in case that the file system receives the releasing request, the releasing request changing the status of the division area from "in use" to "unused", wherein in case that the file system receives the releasing request, the file system changes the division area management information for the division areas to be released by the releasing request so as to change the status to "unused" before the deletion management information for all of the division areas to be released by the releasing request is changed to the non-necessity of the overwrite deletion.

The job execution device may further comprise: an interruption control unit configured to interrupt the overwrite deletion executed by the deletion processing unit when the job is executed by the job execution unit.

In one or more embodiments, in case that the file system changes the division area management information, the management table updating unit stores changed contents of the division area management information, and when the interrupted overwrite deletion is restarted, the management table updating unit changes the deletion management information for the division areas for which the division area management information is changed so as to change the status to "in use" by the file system, to the non-necessity of the overwrite deletion in accordance with the changed contents, and changes the deletion management information for the division areas for which the division area management information is changed so as to change the status from "in use" to "unused" by the file system, to the necessity of the overwrite deletion in accordance with the changed contents.

In one or more embodiments, every when the overwrite deletion for each division area is finished, the interruption control unit determines whether the job is executed by the job execution unit, and during execution of the overwrite deletion for one division area, the deletion processing unit sets the division area management information for the one division area to "in use".

In one or more embodiments, the storing unit is divided into a plurality of partitions, a priority order is assigned to each of the partitions, and the deletion processing unit executes the overwrite deletion preferentially for the division areas included in the partition having a high priority order.

In one or more embodiments, each partition is related to a function which is used by the job execution device, in case that the function is used, the partition which is related to the function is used and a usage frequency of the partition is stored, and the priority order is determined according to the usage frequency.

In one or more embodiments, the job execution device further comprises:

a user judging unit configured to judge a user who uses the job execution device, wherein the deletion management information indicating the necessity of the overwrite deletion includes a priority order corresponding to the user who uses the job execution device when a data is written in the division area, and the deletion processing unit executes the overwrite deletion preferentially for the division area for which the deletion management information has a higher priority order.

In one or more embodiments, the job execution device has a normal mode and a security mode having a higher security for data stored in the storing unit than the normal mode, as an operation mode of the job execution device, and the deletion processing unit executes the overwrite deletion in the security mode.

BRIEF DESCRIPTION OF THE DRAWINGS

The present invention will become more fully understood from the detailed description of embodiments given hereinafter and the accompanying drawings given by way of illustration only, and thus are not intended as a definition of the limits of the present invention.

FIG. 7 is a view showing an example of deletion management information corresponding to a division area management information at a restarting of an overwrite deletion according to one or more embodiments;

FIG. 8 is a view showing an example of a situation in which the management table is updated according to a changed FAT at a restarting of an overwrite deletion according to one or more embodiments;

FIG. 14 is a view showing an example of a management table when a priority deletion mark is attached to each cluster according to one or more embodiments;

FIG. 16 is a view showing an example where the storing resource is oppressed by increasing the data for which overwrite deletion plans to be executed according to one or more embodiments.

DETAILED DESCRIPTION OF EMBODIMENTS

Hereinafter, embodiments of the present invention will be explained with reference to the accompanying drawings.

Figure 1:
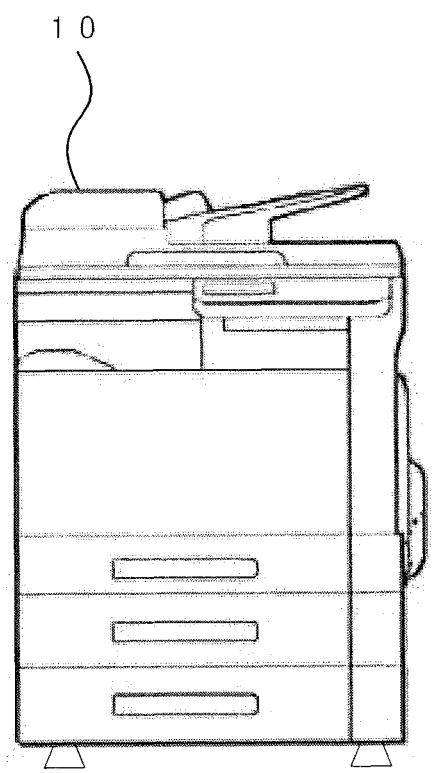
FIG. 1 is an explanation view showing an image forming apparatus according to one or more embodiments.

FIG. 1 shows the image forming apparatus 10 which functions as the job execution device according to according to one or more embodiments.

The image forming apparatus 10 is a so-called multifunction peripheral having the function of executing the jobs, such as a copy job for optically reading an original to print an image on a recording sheet, a scan job for obtaining image data by reading an original to store the image data as a file and/or to transmit the image data to an external terminal, a print job for printing out an image on the recording sheet in accordance with the data received from an PC (Personal Computer), and the like.

The image forming apparatus 10 executes the overwrite deletion for overwriting the meaningless data, such as "0" data or the like, in the storing area in which the unnecessary data is stored, for the hard disk drive 15 (See FIG. 2) which will be explained below.

The storing area of the hard disk drive 15 is managed by dividing the storing area into a large number of small division areas (hereinafter, referred to as "cluster"). The status of each division area, which indicates whether each division area is in use, is managed by using the FAT. In the FAT, the division area management information for indicating whether each division area is in use or unused, is registered. The file system assigns the unused division area to the task caused by executing the job and releases the assigned division area by using the FAT.

Figure 2:
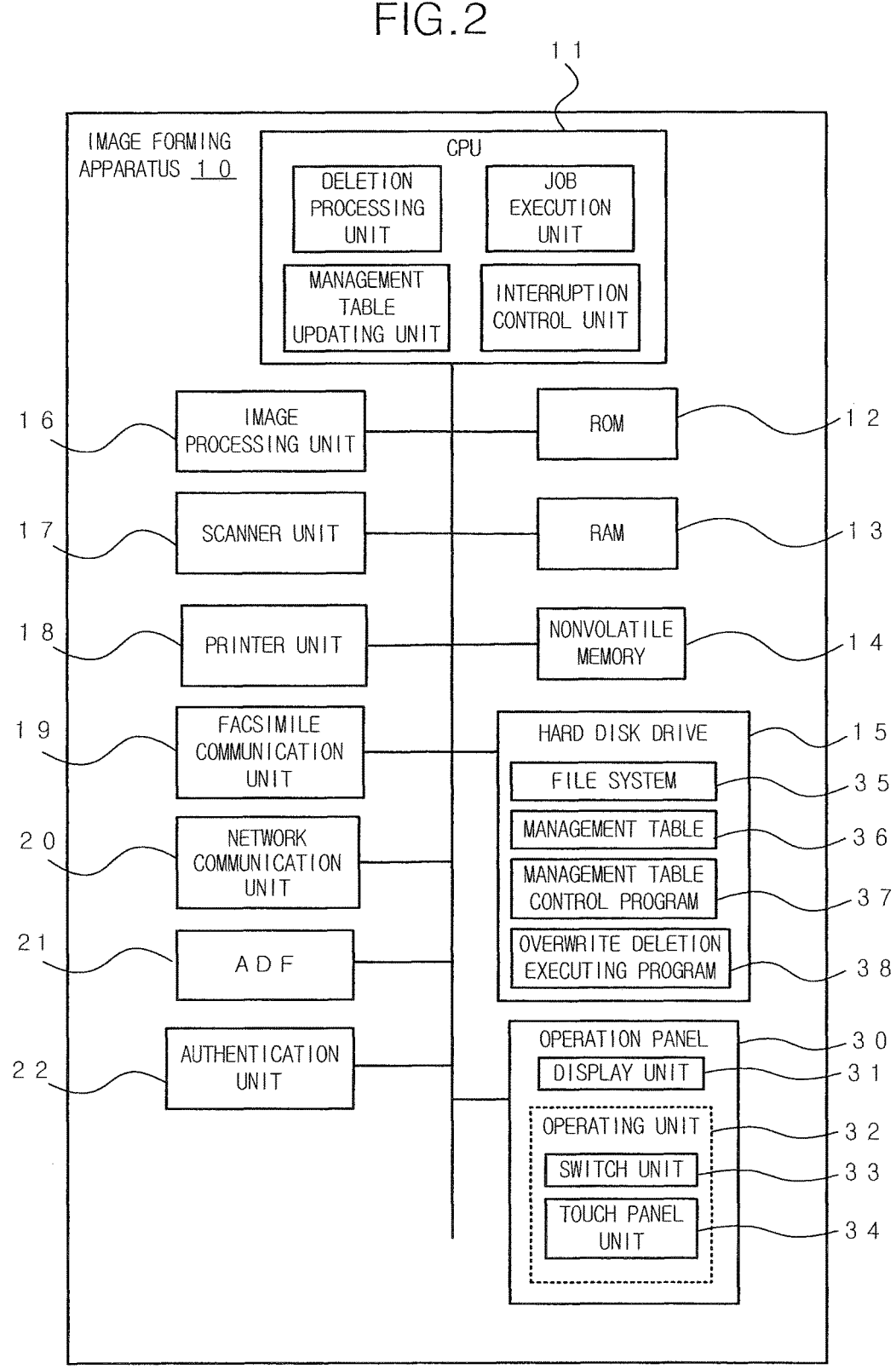
FIG. 2 is a block diagram showing a schematic configuration of the image forming apparatus according to one or more embodiments.

FIG. 2 is a block diagram showing the schematic configuration of the image forming apparatus 10 according to one or more embodiments. The image forming apparatus 10 comprises a CPU (Central Processing Unit) 11 for wholly controlling the operation of the image forming apparatus 10. The CPU 11 is connected with a ROM (Read Only Memory) 12, a RAM (Random Access Memory) 13, a nonvolatile memory 14, the hard disk drive 15, an image processing unit 16, a scanner unit 17, a printer unit 18, a facsimile communication unit 19, a network communication unit 20, an ADF (Auto Document Feeder) 21, an authentication unit 22 and an operating unit 30.

By the CPU 11, a middleware, application programs and the like are executed on an OS (Operating System) program as a base. Further, the CPU 11 functions as the control unit for controlling the display contents of the operating unit 30.

In the ROM 12, various types of programs are stored. By executing the processes by the CPU 11 in accordance with these programs, the functions of the image forming apparatus 10 are realized. Further, in the ROM 12, the program for executing a series of the control of the image forming apparatus 10 by the CPU 11 is stored.

The RAM 13 is used as a work memory for temporarily storing various data when the CPU 11 executes the process in accordance with the programs and as an image memory for storing image data.

The nonvolatile memory 14 is a memory (flash memory) in which the stored contents are not damaged even if the image forming apparatus 10 is turned off, and is used for storing various setting information and the like.

The hard disk drive 15 is a large-capacity nonvolatile memory device. In the hard disk drive 15, an OS program, various types of application programs, user information, print data, image data, a job history and the like, are stored. According to one or more embodiments, in the hard disk drive 15, a file system 35 for updating the FAT, a management table 36 which is a table used when the overwrite deletion is executed, a management table control program 37 which is a program for updating the management table 36 and an overwrite deletion executing program 38 which is a program for executing the overwrite deletion, are stored. The CPU 11 executes various types of programs stored in the hard disk drive 15 by expanding the programs in the RAM 13. That is, the CPU 11 functions as the management table updating unit for updating the management table 36 and the deletion processing unit for executing the overwrite deletion. Further, the CPU 11 functions as the job execution unit for executing the job by using the clusters.

Each of the ROM 12, the RAM 13, the nonvolatile memory 14 and the hard disk drive 15 functions as the storing unit for storing various types of data, and the like.

The image processing unit 16 carries out the rasterizing process for converting print data into image data, the compression/decompression process for the image data, and the like in addition to the processing, such as the enlargement/reduction or the rotation of image data.

The scanner unit 17 has a function of obtaining image data by optically reading an image of an original. The scanner unit 17 comprises, for example, a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 18 has a function of forming an image on the recording paper in accordance with the image data. In one or more embodiments, the printer unit 18 is configured as a so-called laser printer which comprises a conveying device for the recording paper, a photoconductive drum, a charging device, a laser unit, a developing device, a transfer and separation device, a cleaning device and a fixing device, and which forms an image by the electrophotographic process. Alternatively, an image may be formed by another type of printer.

The facsimile communication unit 19 has a function for transmitting and receiving the image data to/from an external device having the facsimile function via a public line.

The network communication unit 20 has a function for communicating data with an external device via a network, such as LAN or the like.

The ADF 21 has a function as an auto document feeder for successively feeding the original having a plurality of sheets to the reading position of the scanner unit 17 when the images of the original are read. It is possible to set the original having about 30 sheets at once, and to omit the task for resetting the original to the original setting tray every when the original is read.

The authentication unit 22 carries out the user authentication. Specifically, when the user is logged in, the authentication unit 22 carries out the user authentication and identifies the login user. That is, the authentication unit 22 functions as the user judging unit for judging a user who uses the image forming apparatus 10. In one or more embodiments, in order to use the image forming apparatus 10, the login is required. Before using the image forming apparatus 10, the user authentication is necessarily carried out. The method for carrying out the user authentication may be an optional suitable method, such as the authentication using the user ID (Identification) and the password, fingerprint authentication or the like.

The operation panel 30 comprises the display unit 31 and the operating unit 32. The operating unit 32 comprises a switch unit 33, such as a start button, a return button and the like, and a touch panel unit 34. The display unit 31 comprises a liquid crystal display (LCD) and the like, and has a function for displaying various types of operation windows, setting windows and the like. In one or more embodiments, the CPU 11 controls the display contents to be displayed on the operation panel 30 and the reception of the operation via the operation panel 30.

The touch panel unit 34 is provided on the display unit 31. The touch panel unit 34 detects the touch position (coordinate position) on which the display screen of the display unit 31 is pressed down by a touch pen, the user's finger or the like. The CPU 11 recognizes the flick operation, the drag operation or the like in accordance with the change in the touch position which is continuously detected (operation information).

In case that a job is input, the image forming apparatus 10 divides the input job into a plurality of tasks, and executes the tasks. For example, the task includes a task for reading and writing data from/in the hard disk drive 15 by using the file system 35, a task for executing the printing, a task for executing the scanning, a task for monitoring whether the storing period of the data for which the storing period is determined elapses and for instructing the file system 35 to release the area in which the data is stored in case that the above storing period has elapsed, and the like.

In one or more embodiments, the priority of the overwrite deletion is set lower than those of the other tasks. In case that another task is caused during the execution of the overwrite deletion, the overwrite deletion is interrupted. After the caused task is finished, the overwrite deletion is restarted. As described above, the CPU 11 has the function as the interruption control unit for interrupting the overwrite deletion.

Figure 3:
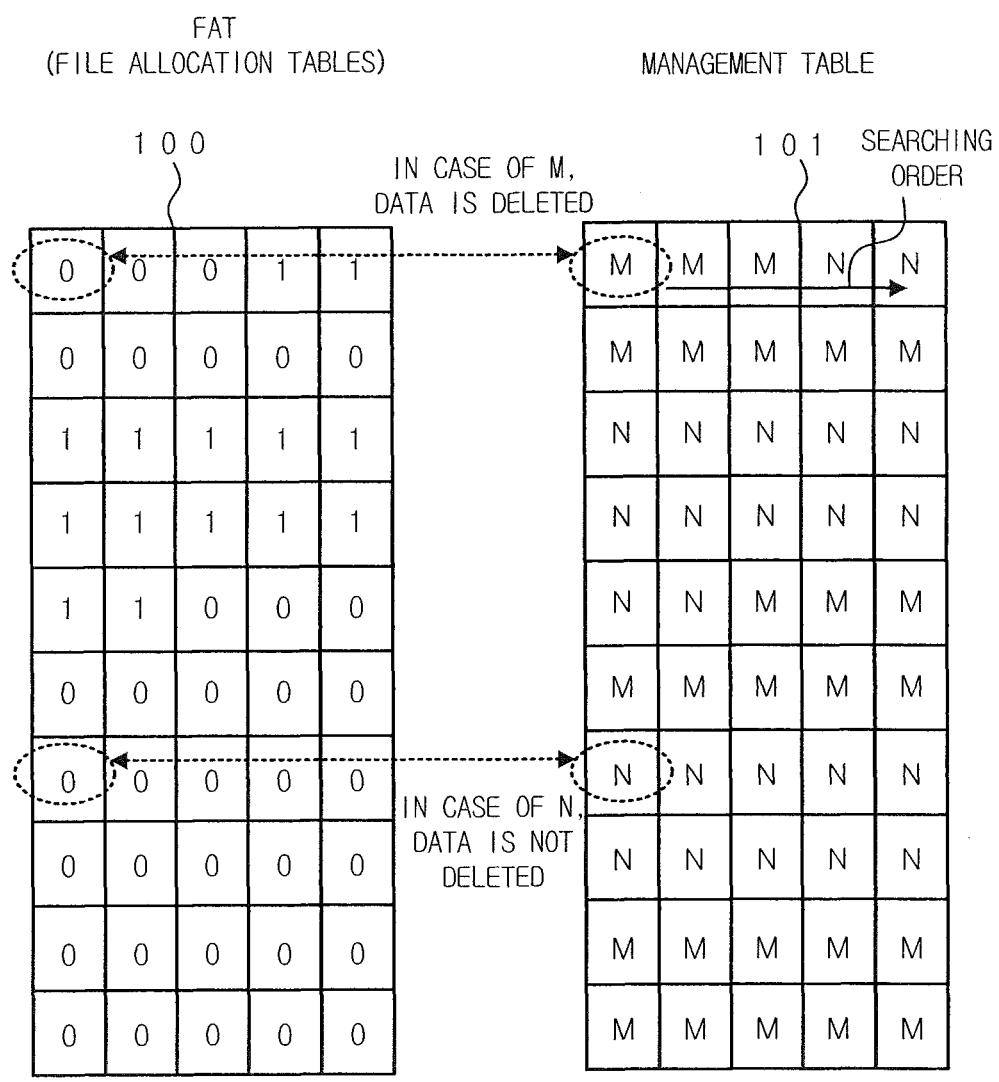
FIG. 3 is a view showing an example of an FAT and a management table according to one or more embodiments.

FIG. 3 shows the FAT and the management table 36 which is used in the overwrite deletion. In the table 100 of FIG. 3, an example of the FAT is shown. In the table 101, an example of the management table 36 is shown. Each box of the table 100 and the table 101 corresponds to one cluster. The boxes arranged on the same position in the table 100 and the table 101 represents the identical cluster. In each box of the table 100, the division area management information indicating whether the corresponding cluster is in use or is unused is registered. In this drawing, the status "in use" is represented by the value "1", and the status "unused" is represented by the value "0". In each box of the table 101, the deletion management information indicating whether the overwrite deletion is necessary is registered. In this drawing, the necessity of the deletion is represented by the mark "M", and the non-necessity of the deletion is represented by the mark "N".

The file system 35 searches the table 100 in case that the request for writing a new data is received from the task for executing the job, or the like. Then, the file system 35 assigns the clusters for which the division area management information indicates the status "unused", to the data writing destination, and changes the division area management information for the clusters from the status "unused" ("0") to the status "in use" ("1").

Further, when the request for releasing the assigned clusters is received from the task for executing the job or the like, the file system 35 changes the division area management information for the clusters to be released by the above request from the status "in use" ("1") to the status "unused" ("0"). In one or more embodiments, the request for releasing the clusters is received for each file, and all of the clusters used for storing the file indicated by the request are released at once.

The management table 36 (in FIG. 3, table 101) is updated by the management table control program 37 (See FIG. 2). In the table 101, the management table control program 37 changes the deletion management information for the clusters for which the division area management information is changed from the status "unused" ("0") to the status "in use" ("1") by the file system 35, to the non-necessity of the deletion "N". Further, in case that the request for releasing the clusters is received for one file by the file system 35, the management table control program 37 changes the deletion management information for the clusters used for storing the file to the necessity of the deletion "M".

The overwrite deletion executing program 38 (See FIG. 2) executes the overwrite deletion. The overwrite deletion executing program 38 searches the management table 36 (in FIG. 3, table 101), and sequentially executes the overwrite deletion process for the clusters for which the deletion management information has the value of the necessity of the deletion (in the drawings, the mark "M"). Then, the overwrite deletion executing program 38 changes the deletion management information for the clusters for which the overwrite deletion process is finished, to the non-necessity of the deletion "N".

Therefore, as shown in FIG. 3, even though the division area management information for one cluster indicates the status "unused" ("0"), the deletion management information for the above cluster may take any one of the necessity of the deletion "M" and the non-necessity of the deletion "N".

As described above, the image forming apparatus 10 manages the status of the use of each cluster and the necessity or the non-necessity of the overwrite deletion by using two tables which are the FAT and the management table 36.

If the overwrite deletion is executed for the cluster for which the division area management information indicates the status "unused" by only referring to the FAT, even though the overwrite deletion is finished, it cannot be recognized from the FAT that the overwrite deletion is not necessary. As a result, the overwrite deletion is repeatedly executed.

In the image forming apparatus 10, because not only the FAT but also the management table 36 is used, it is recognized whether the overwrite deletion for each cluster is finished. Therefore, the overwrite deletion is prevented from being repeatedly executed unnecessarily.

Even though the management table 36 is used, in the configuration in which in case that the request for releasing the area in which the file is stored is received, after the overwrite deletion for all of the clusters indicated by the above request is finished, the division area management information of the FAT is changed from the status "in use" to the status "unused", the usable clusters are gradually decreased when the execution of the overwrite deletion process having the low priority is delayed.

Therefore, in the image forming apparatus 10, when the file system 35 receives the request for releasing the area in which one file is stored is received from the task for executing the job, or the like, the clusters used for storing the above file are registered in the management table 36 as the clusters for which the overwrite deletion is necessary. Further, the division area management information for the above clusters is changed from the statue "in use" to the status "unused" on the FAT. Thereby, even though the overwrite deletion is delayed, it is possible to secure the clusters which can be used for the task for executing the job, or the like.

However, in case that the FAT is updated so as to change the division area management information to the status "unused" before the above overwrite deletion is finished, there is some possibility that a new data is written in the clusters for which the deletion management information has the value of the necessity of the deletion (in the drawings, "M") by the task for executing the job, or the like before the overwrite deletion is executed. In this case, if the deletion management information for the above clusters remains to be set to the "necessity of the deletion", the overwrite deletion is executed for the above clusters.

Therefore, in case that before the overwrite deletion is executed, a new data is written in the clusters for which the deletion is necessary, it is necessary to update the deletion management information for the above clusters to the "non-necessity of the deletion" before the overwrite deletion is executed for the above clusters.

In one or more embodiments, while the task for writing the data in the storing area, such as the task for executing the job and the like (hereinafter, referred to as "the other task") is running, the overwrite deletion is interrupted. After the other task is finished, the overwrite deletion is restarted. One or more embodiments o the invention reflect the change in the FAT, which is caused during the interruption of the overwrite deletion, to the management table 36 when the overwrite deletion is restarted.

Figure 4:
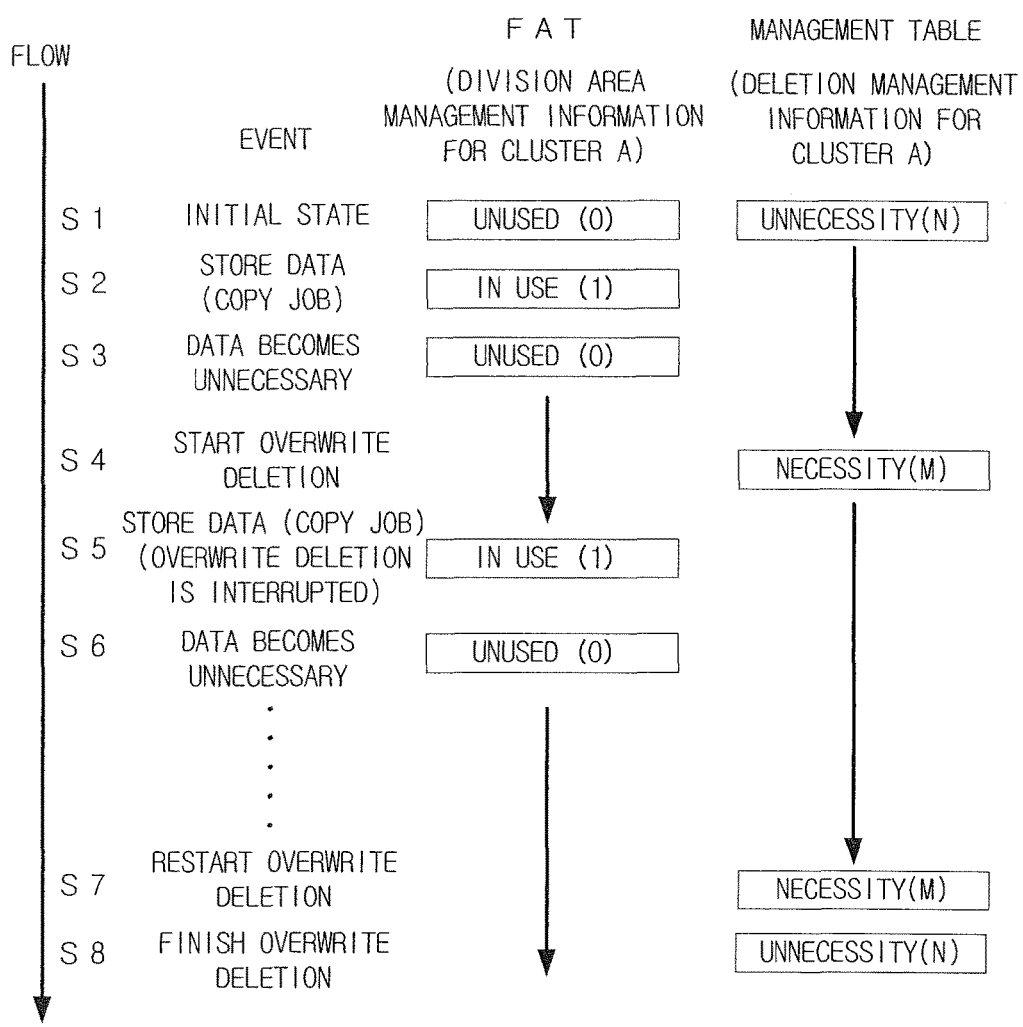
FIG. 4 is a view showing an example in which the image forming apparatus is operated and the division area management information and the deletion management information for one cluster are updated according to one or more embodiments.

FIG. 4 shows an example of the case in which the overwrite deletion is interrupted and restarted during the execution of the job (the other task). FIG. 4 shows an example of the situation in which in case that the image forming apparatus 10 is operated in one or more embodiments, the division area management information and the deletion management information for the specific cluster (referred to as "cluster A") is updated. At the initial state, no data is stored in the cluster A. Therefore, the division area management information indicates the status "unused" ("0") on the FAT, and the deletion management information indicates the non-necessity of the overwrite deletion ("N") on the management table 36 (S1).

Next, for example, by executing the copy job, the image data (new data) obtained by reading an original in the scanner unit 17 is written in the hard disk drive 15. In case that the image data is written in the cluster A, the division area management information is changed from the status "unused" ("0") to the status "in use" ("1"). The deletion management information remains to indicate the non-necessity of the overwrite deletion ("N") (S2).

When the file system 35 receives the request for deleting the above image data which becomes unnecessary from the hard disk drive 15, from the task for executing the copy job, the division area management information for the clusters (including the cluster A) in which the image data is stored is changed from the status "in use" ("1") to the status "unused" ("0"). In one or more embodiments, because the management table 36 is updated at the starting of the overwrite deletion and the restarting of the overwrite deletion, the deletion management information remains to be set to the non-necessity of the overwrite deletion ("N").

When the copy job is finished and the other task is not stocked, the overwrite deletion is started (S4). Before the overwrite deletion is started, the management table 36 is updated and the deletion management information is changed to the necessity of the overwrite deletion ("M"). In FIG. 4, before the overwrite deletion is executed for the cluster A, the next copy job is input. When the copy job is input, the copy job is preferentially executed, and the overwrite deletion is interrupted (S5).

Like S2, by executing the copy job, the new data is overwritten in the cluster A. The division area management information for the cluster A is changed to the status "in use" ("1") again (S5). Because the overwrite deletion is interrupted, the management table 36 is not updated, and the deletion management information remains to be set to the necessity of the overwrite deletion ("M").

Like S3, when the file system 35 receives the request for deleting the above image data which becomes unnecessary from the hard disk drive 15, from the task for executing the copy job, the division area management information for the clusters (including the cluster A) in which the image data is stored is changed from the status "in use" ("1") to the status "unused" ("0") (S6).

When all of the copy jobs are finished, the overwrite deletion is restarted (S7). The image forming apparatus 10 updates the management table 36 before the overwrite deletion is restarted. In FIG. 4, because the unnecessary image data is stored, the deletion management information for the cluster A is updated so as to change the information to the necessity of the overwrite deletion ("M") (Actually, the deletion management information is not changed because the deletion management information has been changed to the necessity of the overwrite deletion ("M") at S4.).

When the overwrite deletion for the cluster A is finished, the deletion management information for the cluster A is changed to the non-necessity of the overwrite deletion ("N") (S8).

Figure 5:
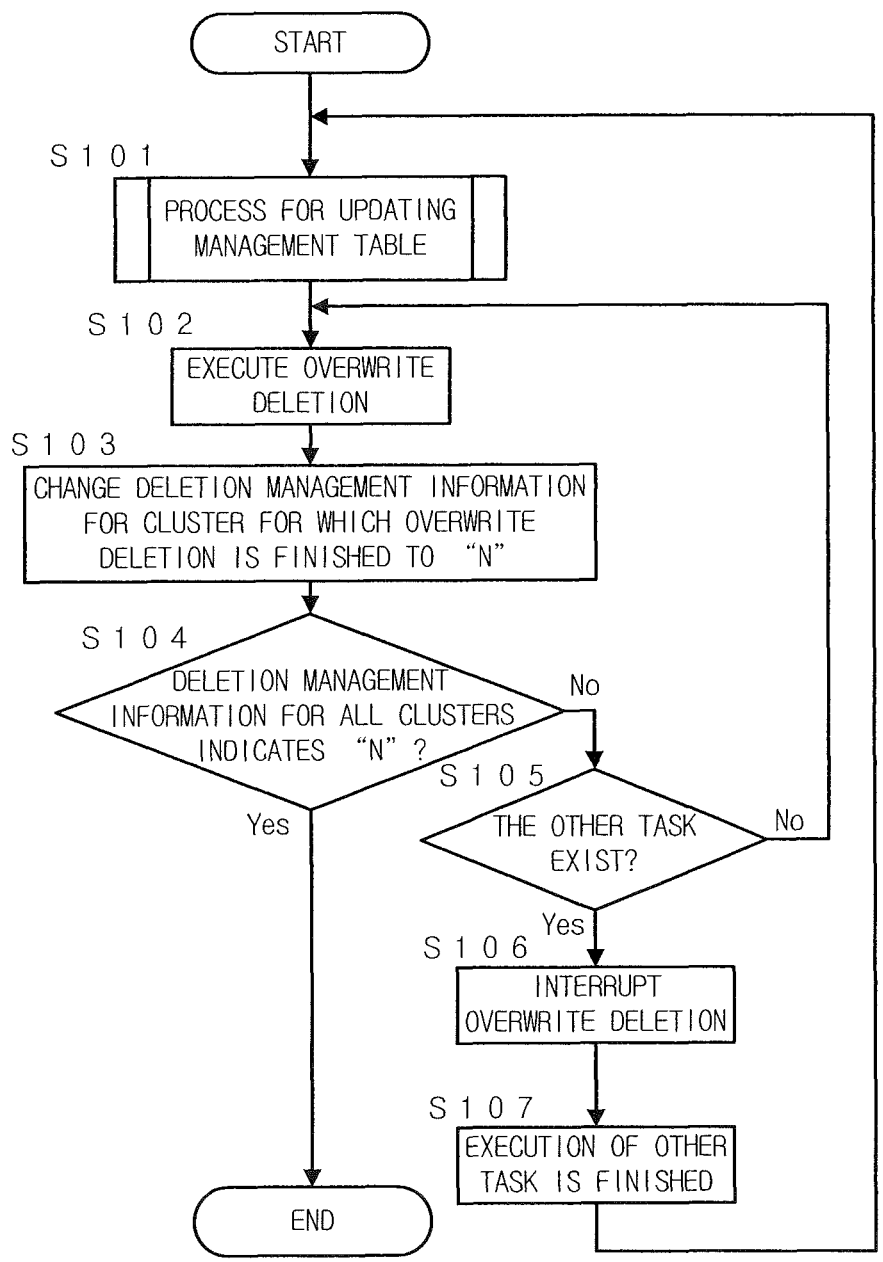
FIG. 5 is a flowchart showing an example of a process executed by the image forming apparatus according to one or more embodiments.

FIG. 5 shows the process which is executed in case that the image forming apparatus 10 executes the overwrite deletion. Firstly, before the overwrite deletion is executed, the process for updating the management table 36 is executed (Step S101).

Then, in accordance with the updated management table 36, the overwrite deletion is executed for one cluster for which the deletion management information having the value of the necessity of the deletion is registered (Step S102). When the overwrite deletion for the cluster is finished, the deletion management information for the cluster is changed to the non-necessity of the deletion ("N") (Step S103).

Until the deletion management information having the value of the necessity of the deletion ("M") does not exist in the management table 36 (Step S104; No), the CPU 11 checks whether the other task which is running exists (whether the job is currently executed) (Step S105). In case that the other task which is running exists (in case that the job is currently executed) (Step S105; Yes), the overwrite deletion is interrupted (Step S106). When the other task is finished (Step S107), the overwrite deletion returns from the interruption and the process is continued by returning to Step S101. That is, when the overwrite deletion returns from the interruption and is restarted, the management table 36 is updated. Then, in accordance with the updated management table 36, the overwrite deletion process is executed.

In case that the other task does not exist (Step S105; No), the overwrite deletion process is executed for the next cluster by returning to Step S102. In case that the deletion management information having the value of the necessity of the deletion ("M") does not exist in the management table 36 (Step S104; Yes), the process is ended.

Figure 6:
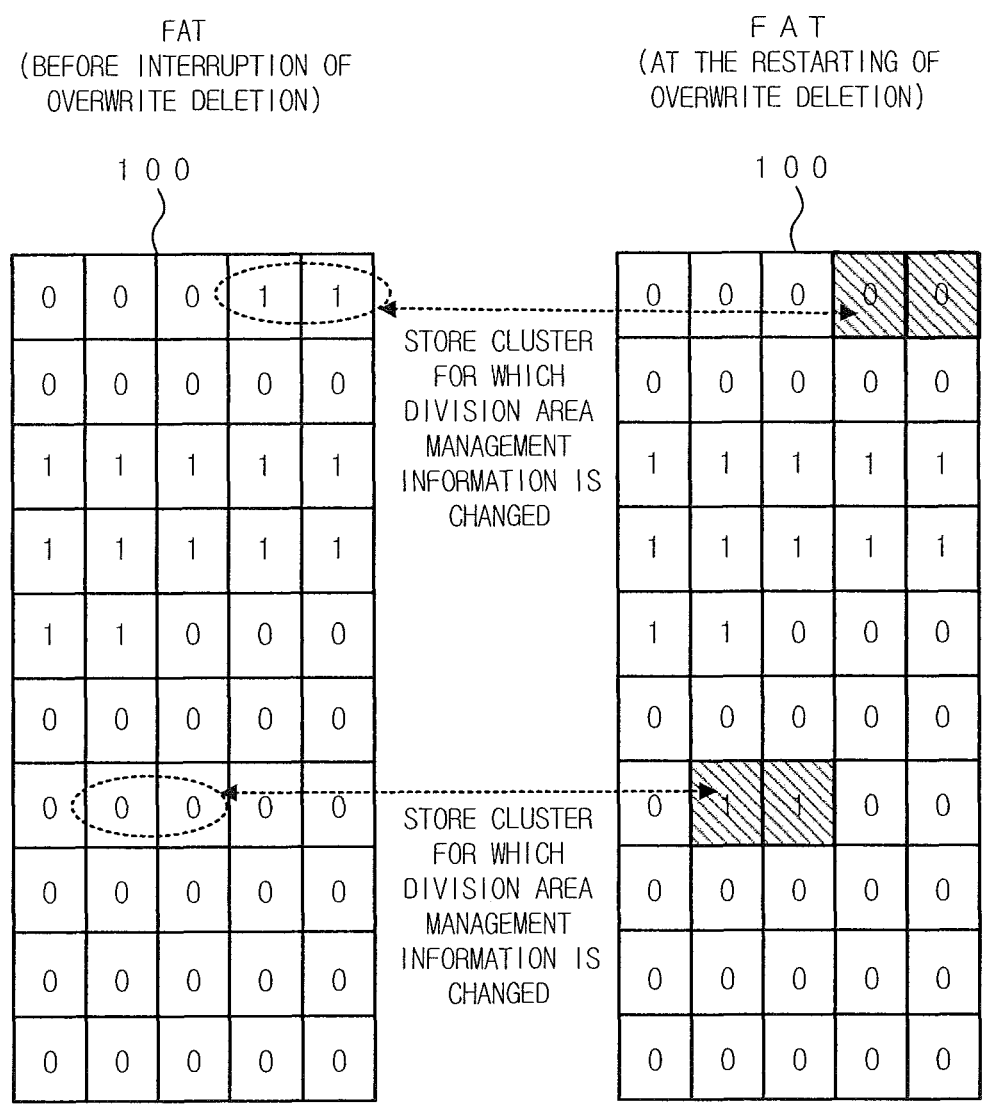
FIG. 6 is a view showing an example of the FATs at the interruption of the overwrite deletion and at the restarting of the overwrite deletion according to one or more embodiments.

In one or more embodiments, at the starting of the overwrite deletion and at the restarting of the overwrite deletion, the process for updating the management table 36 (Step S101) is executed. Specifically, while the overwrite deletion is interrupted, the file system 35 stores the position at which the deletion area management information is changed on the FAT. Then, in the process for updating the management table 36, the management table 36 is updated in accordance with the division area management information of the stored position. The change in the FAT and the management table 36 in the process for updating the management table 36 will be explained by referring to FIG. 6 to FIG. 8. In FIG. 6 to FIG. 8, the above change will be explained by exemplifying the case in which the overwrite deletion is interrupted and the case in which the overwrite deletion is restarted.

FIG. 6 shows the table 100 at the interruption of the overwrite deletion and the table 100 at the restarting of the overwrite deletion. The file system 35 stores the cluster of which the status is changed on the FAT during the interruption of the overwrite deletion. Specifically, the file system 35 stores the cluster (the box which is hatched in the drawings) for which the division area management information is changed from the status "in use" ("1") to the status "unused" ("0") and the cluster (the box which is hatched in the drawings) for which the division area management information is changed from the status "unused" ("0") to the status "in use" ("1") on the FAT.

In case that the division area management information is changed during the interruption of the overwrite deletion even though the division area management information indicates the same status at the timing of the interruption of the overwrite deletion and at the timing of the restarting of the overwrite deletion, the cluster for which the division area management information is changed is stored. For example, in case that after the division area management information is changed from the status "unused" ("0") to the status "in use" ("1"), the division area management information is updated so as to change it to the status "unused" ("0") again during the interruption of the overwrite deletion, the cluster for which the division area management information is updated as described above is stored.

At the restarting of the overwrite deletion, in the management table 36, the deletion management information for the stored cluster is updated. Because only the deletion management information for the stored cluster is updated, it is possible to update the deletion management information for a short time as compared with the case in which the entire of the management table 36 is updated.

FIG. 7 is a table 102 showing the method for updating the deletion management information for the cluster for which the division area management information is changed during the interruption of the overwrite deletion. The value of the updated deletion management information is determined according to the combination of the value of the division area management information and the value of the deletion management information at the restarting of the overwrite deletion (at the update of the deletion management information). According to the table 102, among the clusters for which the division area management information is changed during the interruption of the overwrite deletion, in case that the division area management information indicates the status "in use" ("1") and the deletion management information indicates the non-necessity of the deletion ("N") at the update of the management table 36, the deletion management information for the clusters remains to be set to the non-necessity of the deletion. In case that the division area management information indicates the status "in use" ("1") and the deletion management information indicates the necessity of the deletion ("M"), the deletion management information is updated so as to change it to the non-necessity of the deletion. In case that the division area management information indicates the status "unused" ("0") and the deletion management information indicates the non-necessity of the deletion ("N") at the update of the management table 36, the deletion management information is updated so as to change it to the necessity of the deletion ("M"). In case that the division area management information indicates the status "unused" ("0") and the deletion management information indicates the necessity of the deletion ("M"), the deletion management information remains to be set to the necessity of the deletion ("M").

FIG. 8 shows an example of the situation in which the management table 36 (table 101) is updated at the restarting of the overwrite deletion according to the table 102 shown in FIG. 7. In FIG. 8, in the table 100 and the table 101, the box indicating the cluster for which the division area management information is changed during the interruption of the overwrite deletion is hatched.

Firstly, in case that the division management information for the stored cluster (the hatched box) indicates the status "unused" ("0"), the deletion management information is updated so as to change the deletion management information for the above cluster to the necessity of the deletion ("M").

In case that the division management information for the stored cluster (the hatched box) indicates the status "in use" ("1"), the deletion management information is updated so as to change the deletion management information for the above cluster to the non-necessity of the deletion ("N").

Figure 9:
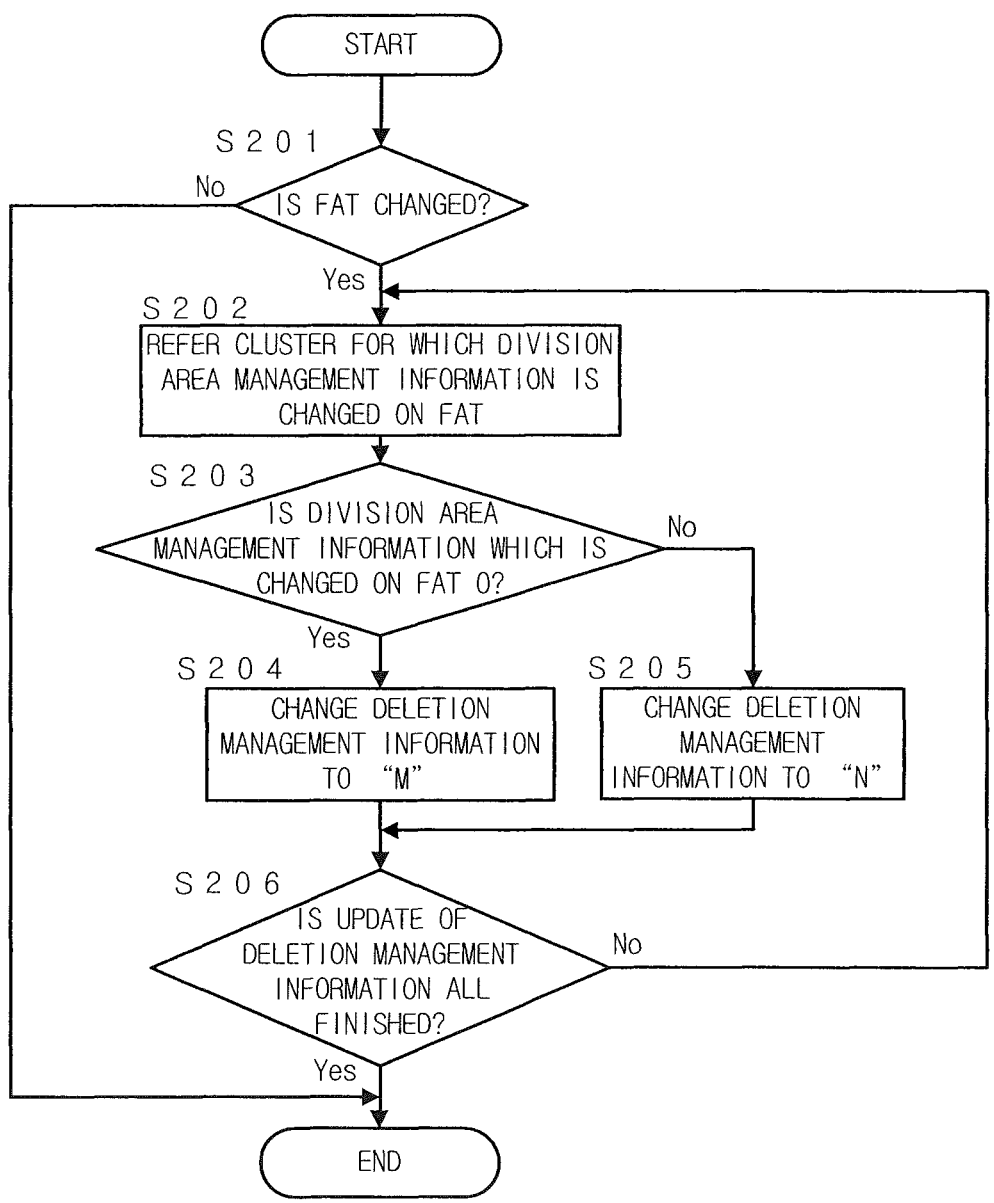
FIG. 9 is a flowchart showing an example of a process for updating the management table according to one or more embodiments.

FIG. 9 shows the detail of the process for updating the management table 36 (Step S101 of FIG. 5). Firstly, it is checked whether there are one or more clusters for which the division area management information is changed on the FAT during the interruption of the overwrite deletion process (after the previous updating process) (Step S201). In case that there is no cluster for which the division area management information is changed (Step S201; No), this process is ended.

In case that there are one or more clusters for which the division area management information is changed (Step S201; Yes), one cluster is selected from the clusters for which the division area management information is changed. Then, the division area management information for the selected cluster is referred (Step S202).

In case that the division area management information for the selected cluster indicates the status "unused" ("0") (Step S203; Yes), the deletion management information for the selected cluster is updated so as to change it to the necessity of the deletion ("M") in the management table 36 (Step S204). Then, the process proceeds to Step S206. In case that the division area management information for the selected cluster indicates the status "in use" ("1") (Step S203; No), the deletion management information for the selected cluster is updated so as to change it to the non-necessity of the deletion ("N") (Step S205). Then, the process proceeds to Step S206.

Until the deletion management information for all of the clusters for which the division area management information is changed is updated (Step S206; No), the process is continued by returning to Step S202. When the deletion management information for all of the clusters for which the division area management information is changed is updated (Step S206; Yes), this process is ended.

In one or more embodiments, as shown in Step 102 to Step S105 of FIG. 5, every when the overwrite deletion for each cluster is finished, it is judged whether the overwrite deletion is interrupted. Therefore, when the overwrite deletion is interrupted by recognizing that the other task exists, the other task has been already started. As a result, the time period in which the other task and the overwrite deletion process are executed in parallel, is caused. In this time period, there is some possibility that the overwrite deletion and the writing of the new data are executed for the identical cluster, and the new data is deleted by the overwrite deletion. In order to avoid this, the image forming apparatus 10 sets the division area management information for the clusters for which the overwrite deletion is currently executed, to the status "in use" ("1") on the FAT.

Specifically, in Step S102 of FIG. 5, after the division area management information for the cluster for which the CPU 11 intends to execute the overwrite deletion is changed to the status "in use", the overwrite deletion process is executed for the above cluster. When the overwrite deletion process for the above cluster is finished, the division area management information for the above cluster is returned to the status "unused".

As described above, during the execution of the overwrite deletion for one cluster, the division area management information for the above cluster is temporarily set to the status "in use". Therefore, it is possible to prevent the other task from writing the new data in the above cluster while the overwrite deletion is executed for the above cluster.

Figure 10:
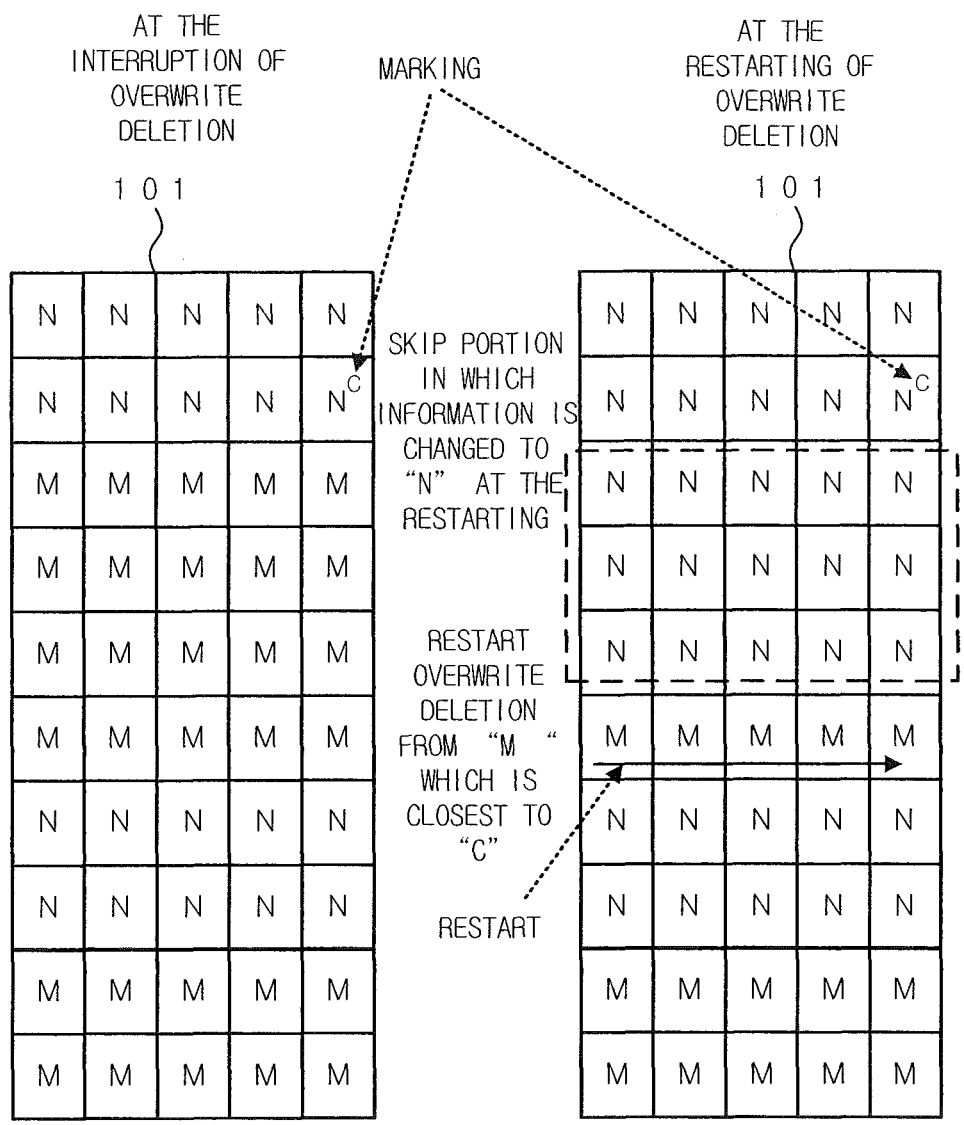
FIG. 10 is a view showing an example in which overwrite deletion is restarted and the starting portion is marked according to one or more embodiments.

Next, the cluster for which the overwrite deletion is initially executed at the restarting of the overwrite deletion will be explained by referring to FIG. 10. FIG. 10 shows an example of the management tables 36 (tables 101) at the interruption of the overwrite deletion and at the restarting of the overwrite deletion.

In general, each cluster is numbered. The image forming apparatus 10 executes the overwrite deletion in order in accordance with the numbers. In the drawing, the overwrite deletion is executed in order from the upper left cluster to the upper right cluster, and then from the left end cluster to the right end cluster of the next lower line.

In case that the overwrite deletion is interrupted, the image forming apparatus 10 stores the number attached to the cluster for which the overwrite deletion is finished immediately before the interruption of the overwrite deletion. In the drawing, the mark C is attached to the cluster (the box) having the number to be stored.

Then, in case that the overwrite deletion is restarted, the image forming apparatus 10 restarts the overwrite deletion from the cluster for which the deletion management information indicates the necessity of the deletion ("M") and which is positioned behind the cluster having the stored number and is the closest to the cluster having the stored number in the above-described order. In the drawing, because the deletion management information for the portion enclosed by the dashed line and including the clusters positioned behind the cluster to which the mark C is attached has been updated at the restarting of the overwrite deletion so as to change it to the non-necessity of the deletion ("N"), the overwrite deletion is restarted by skipping the above portion.

As described above, in the image forming apparatus 10 according to one or more embodiments, when the file system 35 receives the request for releasing the area in which the file is stored, the division area management information for the clusters in which the file is stored is immediately changed to the status "unused" ("0"). Therefore, even though the execution of the overwrite deletion is delayed by preferentially executing the job, the usable storing area is secured. Further, it is possible to avoid the overwrite deletion being executed for the clusters in which the new data is written. That is, in the image forming apparatus 10 according to one or more embodiments, it is possible to smoothly execute the job by preferentially executing the job over the overwrite deletion process, and to effectively use the storing area by using the released clusters without waiting for the finish of the overwrite deletion.

As described above, according to one or more embodiments, one FAT may be assigned to the hard disk drive 15. In other embodiments, the storing area of the hard disk drive 15 may be divided into a plurality of partitions and the FAT and the management table 36 may be assigned to each partition.

The hardware configuration of the image forming apparatus 10 may be the same as that of the image forming apparatus 10 described above. Explanation of the same points is omitted.

In one or more embodiments, the priority order is assigned to each partition. The overwrite deletion is preferentially executed for the partition having the high priority order. The method for assigning the priority order will be explained below.

Figure 11:
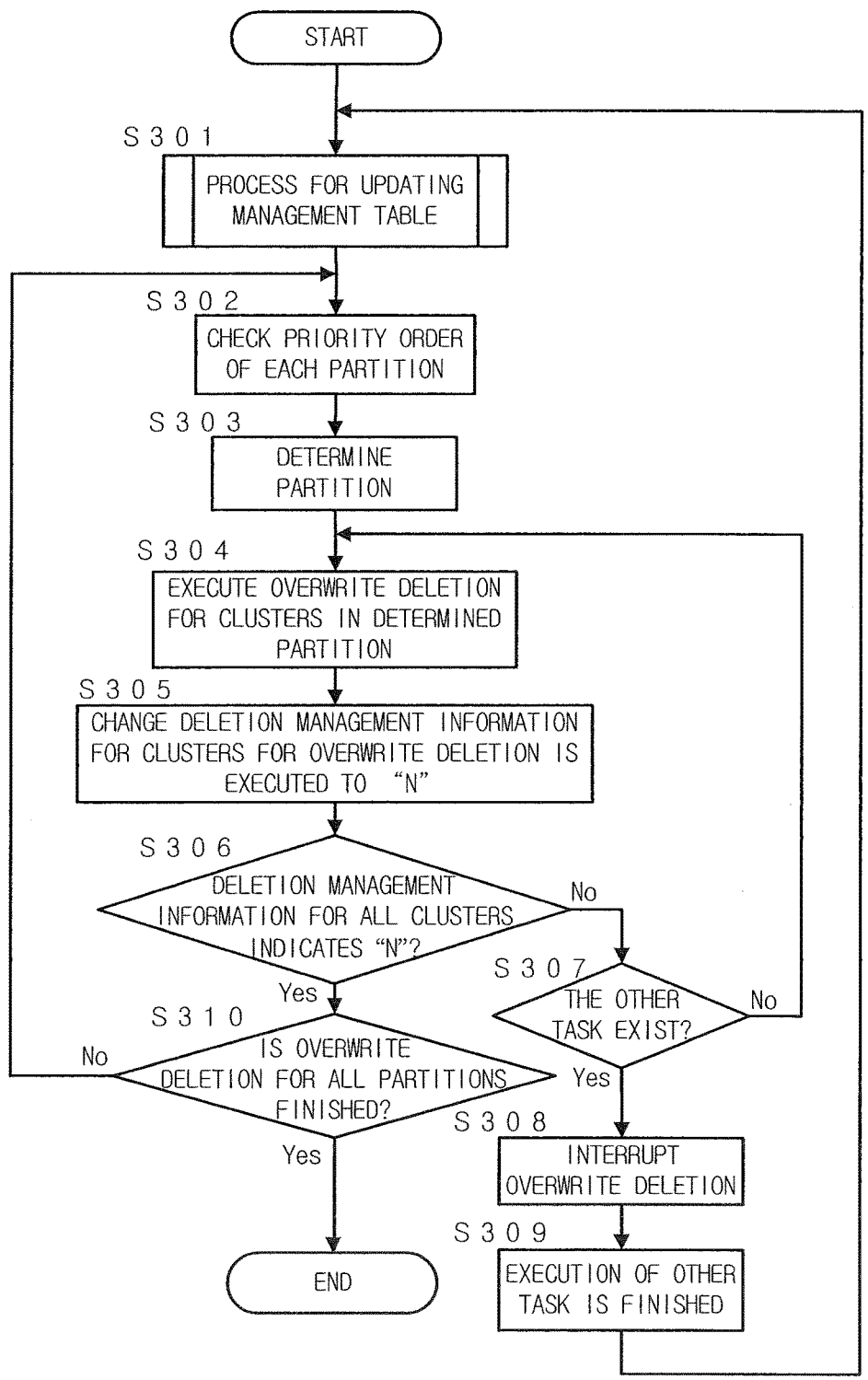
FIG. 11 is a flowchart showing an example of a process executed by the image forming apparatus according to one or more embodiments.

FIG. 11 shows the process which is executed in case that the image forming apparatus 10 executes the overwrite deletion in one or more embodiments. Firstly, before the overwrite deletion is executed, the process for updating the management table 36 is executed (Step S301). The process of Step S301 is the same as the process shown in FIG. 9. In one or more embodiments, the management tables 36 of all of the partitions are updated.

The priority order of each partition is checked (Step S302). The partition having the highest priority order among the partitions corresponding to the management table 36 in which the deletion management information having the value of the necessity of the deletion ("M") is included, is determined as the partition for which the overwrite deletion is executed (Step S303).

Then, in accordance with the management table 36 corresponding to the determined partition, the overwrite deletion is executed for one of the clusters for which the deletion management information having the value of the necessity of the deletion ("M") is registered (Step S304). When the overwrite deletion for the above cluster is finished, the deletion management information for the above cluster is changed to the non-necessity of the deletion ("N") (Step S305).

In case that the deletion management information having the value of the necessary of the deletion ("M") exists in the management table 36 corresponding to the determined partition (Step S306; No), the CPU 11 checks whether the other task which is running exists (whether the job is currently executed) (Step S307). In case that the other task which is running exists (in case that the job is currently executed) (Step S307; Yes), the overwrite deletion is interrupted (Step S308). When the other task is finished (Step S309), the overwrite deletion returns from the interruption and the process is continued by returning to Step S301. That is, when the overwrite deletion returns from the interruption and is restarted, the management table 36 is updated.

In case that the other task does not exist (Step S307; No), the process is continued by returning to Step S304. In case that the deletion management information having the value of the necessity of the deletion ("M") does not exist in the management table 36 corresponding to the determined partition (Step S306; Yes), it is checked whether the overwrite deletion for all of the partitions is finished (Step S310). In case that the unprocessed partition exists (Step S310; No), the process is continued by returning to Step S302. When the overwrite deletion for all of the partitions is finished (Step S310; Yes), the process is ended.

Figure 12:
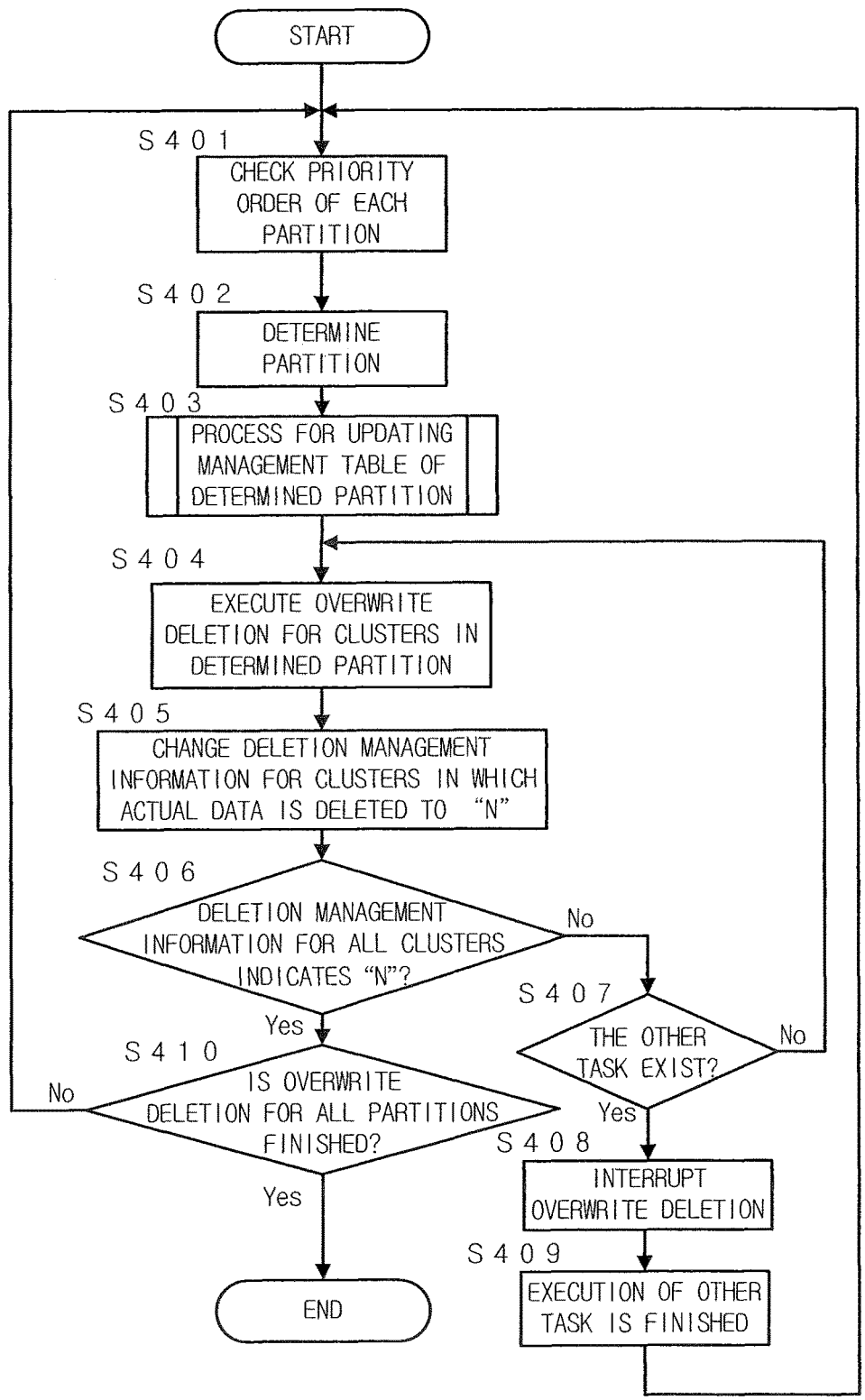
FIG. 12 is a flowchart showing another example of a process executed by the image forming apparatus according to one or more embodiments.

The determination of the partition for which the overwrite deletion is executed may be executed before the process for updating the management table 36. FIG. 12 shows the process which is executed in case that the determination of the partition for which the overwrite deletion is executed is executed before the process for updating the management table 36.

Firstly, the priority order of each partition is checked (Step S401). The partition having the highest priority order is determined as the partition for which the overwrite deletion is executed (Step S402). Then, the management table 36 corresponding to the partition for which the overwrite deletion is executed is updated (Step S403).

Then, in accordance with the management table 36 corresponding to the determined partition, the overwrite deletion is executed for one of the clusters for which the deletion management information having the value of the necessity of the deletion ("M") is registered (Step S404). When the overwrite deletion for the above cluster is finished, the deletion management information for the above cluster is changed to the non-necessity of the deletion ("N") (Step S405).

In case that the deletion management information having the value of the necessary of the deletion ("M") exists in the management table 36 corresponding to the determined partition (Step S406; No), the CPU 11 checks whether the other task which is running exists (whether the job is currently executed) (Step S407). In case that the other task which is running exists (in case that the job is currently executed) (Step S407; Yes), the overwrite deletion is interrupted (Step S408). When the other task is finished (Step S409), the overwrite deletion returns from the interruption and the process is continued by returning to Step S401.

In case that the other task does not exist (Step S407; No), the process is continued by returning to Step S404. In case that the deletion management information having the value of the necessity of the deletion ("M") does not exist in the management table 36 corresponding to the determined partition (Step S406; Yes), it is checked whether the overwrite deletion for all of the partitions is finished (Step S410). In case that the unprocessed partition exists (Step S410; No), the process is continued by returning to Step S401. When the overwrite deletion for all of the partitions is finished (Step S410; Yes), the process is ended.

Next, the method for determining the priority order of each partition will be explained. The image forming apparatus 10 previously relates any of the partitions to each function, such as the scan function, the copy function and the like. In case that one function is executed, the partition which is related to the executed function is used.

The priority order of each partition is determined according to the usage frequency of the function to which the partition is related and the update frequency of the management table 36. For example, in case that the usage frequency of the copy function is high, there is a high possibility that a new data is overwritten in the partition which is related to the copy function before the overwrite deletion is finished. Therefore, the priority order thereof may be set lower than that of the partition which is related to another function.

In addition, like the partition in which the data is written in order to temporarily store the data, or the like, the partition corresponding to the management table 36 which is frequently updated may have the priority order which is set higher than that of another partition. On the other hand, the partition for storing the data which is not deleted for a long time once the data is written (for example, the box which is the storing area assigned to each user or each group) may have the priority order which is set lower than that of another partition. Further, in case that the user instructs the image forming apparatus to delete the file, the overwrite deletion may be immediately executed by raising the priority order of the partition including the storing area in which the file to be deleted is stored. The method for determining the priority order of each partition is not limited to the above method. Another method may be adopted.

As described above, in one or more embodiments, in accordance with the priority order which is set to each partition, the overwrite deletion is executed from the partition having the high priority order. Thereby, as compared with the actual data remaining in another partition, the actual data remaining in the partition having the high priority order is hardly read by an external device. For example, by executing the overwrite deletion preferentially for the partition in which the actual data of an important file remains, the security for the above file is improved.

As described above, in one or more embodiments, the order in which the overwrite deletion is executed may be changed in accordance with the priority order of each partition. In other embodiments, the order in which the overwrite deletion is executed may be changed in accordance with another standard.

The hardware configuration of the image forming apparatus 10 may be the same as that of the image forming apparatus 10 described above. Explanation of the same points is omitted.

In one or more embodiments, instead of the partition, according to the contents of the data stored in each cluster or the user who uses the image forming apparatus 10 when the data is written, the cluster for which the overwrite deletion is preferentially executed is determined.

Figure 13:
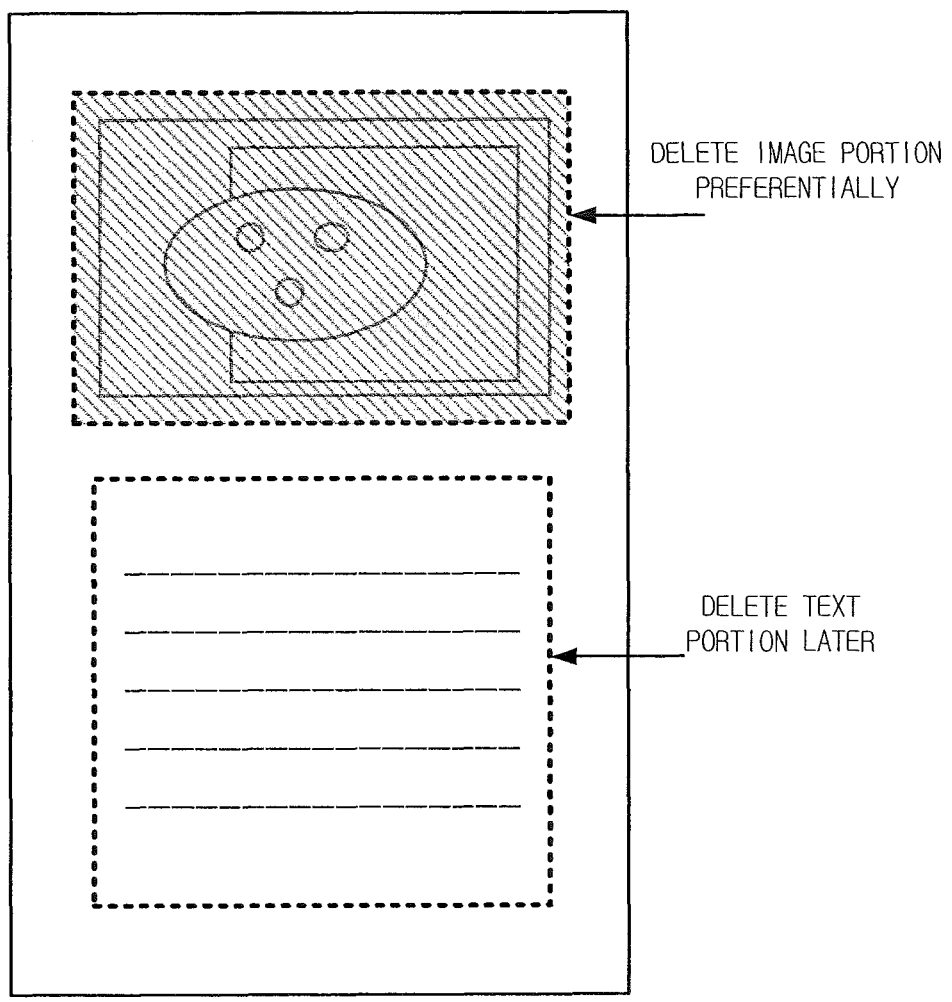
FIG. 13 is a view showing an example order of an overwrite deletion when the overwrite deletion is executed for an image portion and a text portion in a file according to one or more embodiments.

Firstly, the case in which the cluster for which the overwrite deletion is preferentially executed is determined in accordance with the contents of the data, will be explained. For example, in case that file to be deleted includes an image and a text, the image forming apparatus 10 recognizes the image portion and the text portion by executing the area recognition, such as the OCR (Optical Character Recognition) or the like. Then, in case that the cluster in which the image portion data is stored is released, the overwrite deletion is executed preferentially for the above cluster. FIG. 13 shows the situation in which the image portion and the text portion are recognized in a file and the overwrite deletion is preferentially executed for cluster in which the image portion data is stored.

Next, the case in which the cluster for which the overwrite deletion is preferentially executed is determined in accordance with the user who uses the image forming apparatus 10, will be explained. For example, the image forming apparatus 10 executes the overwrite deletion preferentially for the clusters in which the data is stored when the image forming apparatus 10 is used by the user A, or in which the data to be deleted by the request received from the user A is stored, over the clusters in which the data is stored when the image forming apparatus 10 is used by another user, or in which the data to be deleted by request received from another user is stored.

Next, the method for determining the cluster for which the overwrite deletion is preferentially executed in case that the overwrite deletion is executed, will be explained. When the data is stored in the storing area managed by the FAT, the image forming apparatus 10 determines the priority of the overwrite deletion according to the contents of the data or the login user who currently uses the image forming apparatus 10. Then, the deletion priority mark corresponding to the determined priority is attached to the deletion management information for the cluster in which the above data is stored.

Figure 14:
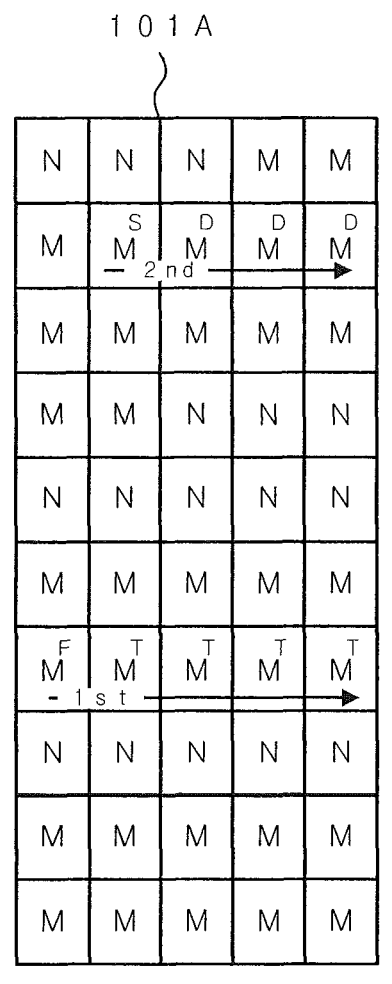

FIG. 14 shows the table 101A which is an example of the management table 36 in which the deletion management information to which the deletion priority mark is attached is registered. In FIG. 14, as examples of the deletion priority mark, the most important deletion case head mark, the most important deletion case mark, the important deletion case head mark, and the important deletion case mark are attached to the deletion management information. In this drawing, the most important deletion case head mark is denoted by "F". The most important deletion case mark is denoted by "T". The important deletion case head mark is denoted by "S". The important deletion case mark is denoted by "D".

The most important deletion case head mark (F) is attached to the head cluster in the cluster group for which the overwrite deletion is executed the most preferentially. The most important deletion case mark (T) is attached to the clusters except the head cluster in the cluster group for which the overwrite deletion is executed the most preferentially.

The important deletion case head mark (S) is attached to the head cluster in the cluster group for which the overwrite deletion is executed not the most preferentially but preferentially. The important deletion case mark (D) is attached to the clusters except the head cluster in the cluster group for which the overwrite deletion is executed not the most preferentially but preferentially.

In case that the overwrite deletion is started (or restarted), firstly, the deletion management information to which the most important deletion case head mark (F) is attached is searched from the deletion management information having the value of the necessity of the deletion ("M") on the management table 36. In case that the cluster for which the deletion management information to which the most important deletion case head mark (F) is attached is registered exists, the overwrite deletion is executed for the searched cluster. Then, the overwrite deletion is executed for the clusters for which the deletion management information to which the most important deletion case mark (T) is attached is registered, in order.

In case that the clusters for which the deletion management information to which the most important deletion case mark (T) is attached is registered do not remain, or in case that the clusters for which the deletion management information to which the most important deletion case head mark (F) is attached is registered do not exist initially, the deletion management information to which the important deletion case head mark (S) is attached is searched.

In case that the cluster for which the deletion management information to which the important deletion case head mark (S) is attached is registered exists, the overwrite deletion is executed for the searched cluster. Then, the overwrite deletion is executed for the clusters for which the deletion management information to which the important deletion case mark (D) is attached is registered, in order. In case that the clusters for which the deletion management information to which the important deletion case mark (D) is attached is registered do not remain, the overwrite deletion is executed for the clusters for which the deletion management information having the value of the necessity of the deletion ("M") is registered, in the same order as those of the above-described embodiments.

As described above, in one or more embodiments, in accordance with the contents of the data or the user who uses the image forming apparatus 10 when the data is stored, the cluster in which the data to be deleted preferentially is stored is determined. Then, the overwrite deletion is preferentially executed for the determined cluster. Therefore, for example, by executing the overwrite deletion preferentially for the clusters in which the actual data of an important file remains, the above file is hardly read by an external device.

As described above, in one or more embodiments, a selection made be made as to whether the overwrite deletion is executed.

In other embodiments, the image forming apparatus 10 can switch the operation mode between the normal mode and the security mode in which the security for the file is higher than that of the normal mode. The above switching is executed by the user's instruction. The hardware configuration of the image forming apparatus 10 may be the same as that of the image forming apparatus 10 as described above. Explanation of the same points is omitted accordingly.

The image forming apparatus 10 executes the overwrite deletion in the security mode. However, in the normal mode, the execution of the overwrite deletion is prohibited. Specifically, the overwrite deletion is executed only when the management table 36 exists. When the operation mode is changed from the normal mode to the security mode, the management table 36 is prepared. When the operation mode is changed from the security mode to the normal mode, the management table 36 is deleted. Thereby, the execution of the overwrite deletion is prohibited in the normal mode.

Figure 15:
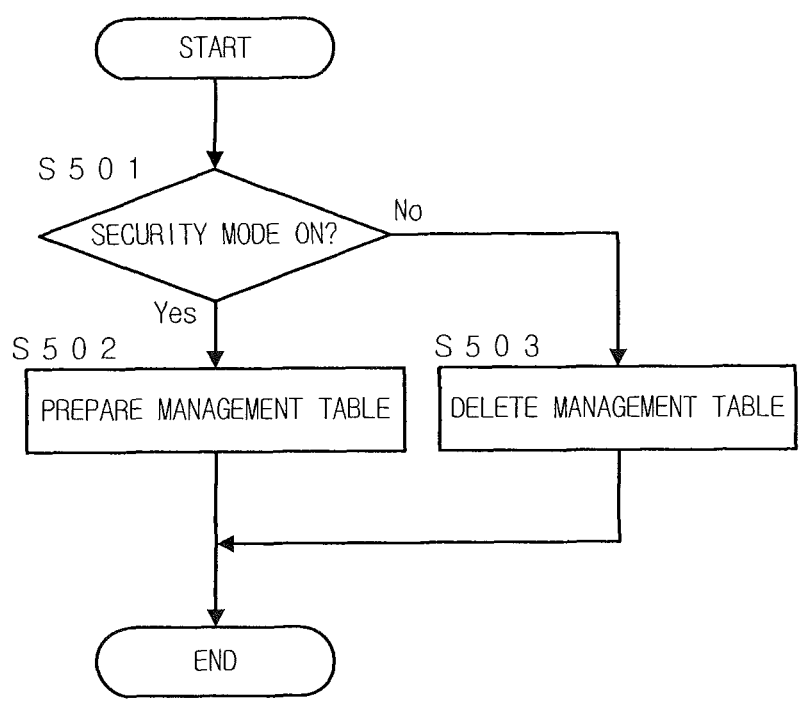
FIG. 15 is a flowchart showing an example of a process for determining whether a management table is prepared according to one or more embodiments.

FIG. 15 shows the process which is executed when the image forming apparatus 10 changes the operation mode in the fourth embodiment. Firstly, in case that the operation mode is changed from the normal mode to the security mode (Step S501; Yes), the management table 36 is prepared (Step S502). Then, the process is ended. In case that the operation mode is changed from the security mode to the normal mode (Step S501; No), the management table 36 is deleted (Step S503). Then, the process is ended.

As described above, in the fourth embodiment, because it can be switched whether the overwrite deletion is executed, in case that the overwrite deletion is not executed, it is possible to restore the data which is wrongly deleted.

As described above, in one or more embodiments, when the other task is caused during the execution of the overwrite deletion, the overwrite deletion may be interrupted. In other embodiments, when the other task is caused during the execution of the overwrite deletion, the overwrite deletion may be executed in parallel with the other task without interrupting the overwrite deletion.

The hardware configuration of the image forming apparatus 10 may be the same as that of the image forming apparatus 10 described above. Explanation of the same points is omitted.

The timing of updating the management table 36 according to one or more embodiments will be explained. In some of the embodiments described above, the management table 36 is updated at the starting of the overwrite deletion and at the restarting of the overwrite deletion after the interruption thereof. On the other hand, in one or more embodiments, when the division area management information is updated on the FAT, the management table 36 may be updated in synchronization with the update of the division area management information.

Specifically, when the division area management information for one cluster is changed from the status "unused" ("0") to the status "in use" ("1"), the deletion management information for the above cluster is immediately changed to the non-necessity of the overwrite deletion ("N"). Further, when the division area management information for one cluster is changed from the status "in use" ("1") to the status "unused" ("0"), the deletion management information for the above cluster is immediately changed to the necessity of the overwrite deletion ("M"). When the overwrite deletion for the cluster for which the deletion management information having the value of the necessity of the overwrite deletion ("M") is registered is finished, the above deletion management information is changed to the non-necessity of the overwrite deletion ("N").

In order to prevent the overwrite deletion and the writing of the new data from being executed for the identical cluster at the same time, before the overwrite deletion is executed for one cluster, the division area management information for the above cluster is changed to the status "in use" ("1") on the FAT. When the overwrite deletion for the above cluster is finished, the division area management information is returned to the status "unused" ("0").

In detail, when the overwrite deletion for one cluster is started, it is confirmed whether the division area management information for the above cluster indicates the status "unused" ("0"). In case that the division area management information indicates the status "in use" ("1"), the cluster for which the CPU 11 intends to execute the overwrite deletion is changed. In case that the division area management information indicates the status "unused" ("0"), the division area management information is changed to the status "in use" ("1") and the overwrite deletion process is executed for the above cluster. When the overwrite deletion process for the above cluster is finished, the division area management information for the above cluster is returned to the status "unused" ("0").

As described above, in t one or more embodiments, the overwrite deletion is executed in parallel with the other task. This may be useful, for example, when the CPU has a high performance and the execution of the job is not influenced by executing the job and the overwrite deletion at the same time. Because the overwrite deletion process is always executed, it is possible to immediately prevent the data which is stored in the released clusters, from being read.

This may also be useful when the switching control is executed for the tasks by the real-time OS. In case that the priority of the task for executing the overwrite deletion is set lower than that of the task for executing the job, the job is preferentially executed and the overwrite deletion process can be executed by using the idle time of the CPU during the execution of the job.

Various embodiments have been explained by using the drawings. However, in the present invention, the concrete configuration is not limited to the above embodiments. In the present invention, various modifications of the above embodiments or the addition of various functions or the like to the embodiments can be carried out without departing from the gist of the invention.

In one or more embodiments, in case that the overwrite deletion is executed, the "0" data is overwritten. However, another data may be used. For example, a random data or the like may be overwritten. Further, in addition to the deletion which is executed in compliance with the ISO, the overwrite deletion may be executed in accordance with the DoD (United States Department of Defense) standard or the like.

In one or more embodiments, the image forming apparatus 10 is exemplified. However, the present invention also includes the job execution device having the function for executing the above data deletion, the non-transitory computer-readable recording medium storing the program for causing an information processing apparatus to execute the above data deletion, and the data deletion method.

In one or more embodiments, one cluster is explained as one division area. However, the unit of the division area may be optionally set except one cluster.

In one or more embodiments, every when the overwrite deletion for each cluster is finished, it is checked whether the other task except the overwrite deletion is started. The interval of the above check is not limited to this. However, in case that the above check is executed at another interval (every when the overwrite deletion for two or more clusters is finished), the division area management information for all of the clusters for which the overwrite deletion is executed for the above interval is set to the status "in use". Thereby, the data which is newly written is prevented from being unreadable by the overwrite deletion.

In one or more embodiments, when the file system 35 receives the request for releasing the storing area from the task for executing the job, or the like, the file system 35 immediately changes the division area management information for the clusters included in the storing area to be released by the above request to the status "unused" ("0"). However, the timing of changing the division area management information to the status "unused" ("0") is not limited to this. At least, in case that before the overwrite deletion for all of the clusters included in the storing area to be released by the above request is finished, the division area management information for the above clusters is changed, the storing area is effectively used as compared with the case in which after the overwrite deletion for all of the clusters included in the storing area to be released by the above request is finished, the division area management information for the above clusters is changed to the status "unused". As a result, there is no lack of usable area.

One or more embodiments provide a job execution device, a non-transitory computer-readable recording medium and a data deletion method which can delete the actual data stored in the storing area so as to be unreadable while the storing area is effectively used.

In one or more embodiments, by the file system, the deletion management information for the division area for which the division area management information is changed so as to change the status from "unused" to "in use" is changed to the non-necessity of the overwrite deletion. In case that the file system receives the releasing request for changing the status of the division area from "in use" to "unused, the deletion management information for the division areas to be released by the releasing request is changed to the necessity of the overwrite deletion. Then, before the deletion management information for all of the division areas to be released by the releasing request is changed to the non-necessity of the overwrite deletion by the execution of the overwrite deletion, the division area management information for the division areas to be released by the releasing request is changed so as to change the status to "unused". Thereby, before the overwrite deletion for all of the division areas to be released by the releasing request is finished, a new data can be written in these division areas.

Further, in case that the division area management information for a certain division area is changed so as to change the status to "in use", the deletion management information for this division area is changed to the non-necessity of the overwrite deletion. Therefore, it is possible to prevent the overwrite deletion from being executed for the division areas in which the new data is written. During the execution of the job, the overwrite deletion may be interrupted or the overwrite deletion may be executed in parallel with the execution of the job.

In one or more embodiments, during the execution of the job, the overwrite deletion is interrupted. Thereby, the execution of the job is not hindered by the overwrite deletion.

In one or more embodiments, the contents of the division area management information, which are changed during the interruption of the overwrite deletion are stored. When the overwrite deletion is restarted, the contents which are changed during the interruption of the overwrite deletion are reflected to the management table. Specifically, the deletion management information for the division areas for which the division area management information is changed so as to change the status to "in use" by the file system, is changed to the non-necessity of the overwrite deletion, and the deletion management information for the division areas for which the division area management information is changed so as to change the status from "in use" to "unused" by the file system, is changed to the necessity of the overwrite deletion. Thereby, after the overwrite deletion is restarted, the overwrite deletion is executed in accordance with the management table in which the contents changed during the interruption of the overwrite deletion are reflected. For example, it is possible to prevent the overwrite deletion from being executed for the division areas in which the new data is written during the interruption of the overwrite deletion.

In one or more embodiments, every when the overwrite deletion for each division area is finished, it is judged whether the job is executed. Therefore, there is some possibility that the execution of the job is started during the overwrite deletion for a curtain division area. In this case, when the new data is written by the job in the division area for which the overwrite deletion is currently executed, the new data is likely deleted by the overwrite deletion. Therefore, during the execution of the overwrite deletion for one division area, the division area management information for this division area is temporarily changed so as to change the state to "in use". As a result, the new data is prevented from being written in this division area by the job.

In one or more embodiments, the storing unit is divided into a plurality of partitions, and the overwrite deletion is executed preferentially for the division areas included in the partition having the assigned high priority order. The actual data remaining in the partition having the high priority order is hardly read by an external device as compared with the actual data remaining in another partition.

In one or more embodiments, the priority order is determined according to the usage frequency of the partition. For example, in the partition related to the function which is frequently used, the data is frequently overwritten. Therefore, the priority order of this partition may be set lower than that of another partition.

In one or more embodiments, a user who uses the job execution device is judged. According to the user who uses the job execution device when a data is written, the priority order is assigned to the deletion management information for the division area in which the data is written. Then, the overwrite deletion is executed preferentially for the division area for which the deletion management information has the higher priority order. Therefore, by setting the priority order corresponding to the user who handles important data higher than that of another user, the important data which is written by the above user's operation is hardly read by an external device as compared with another actual data in case that the data remains as the actual data.

In one or more embodiments, it is possible to select whether the overwrite deletion is executed. For example, only in the security mode, the management table is prepared. On the other hand, in the normal mode, the management table is deleted. Thereby, in the normal mode, the overwrite deletion cannot be executed.

According to the job execution device according to one or more embodiments, the non-transitory computer-readable recording medium and the data deletion method, it is possible to delete the actual data stored in the storing area so as to be unreadable while the storing area is effectively used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. A job execution device, comprising:
  a memory that stores:
    a file system that, when executed by a processor coupled with the memory, divides a storing area of the memory into a plurality of division areas and manages the storing area of the memory by using a file allocation table in which division area management information indicating a status of each of the division areas is registered, the status indicating that each division area is in use or unused, and
    a management table in which deletion management information indicating whether an overwrite deletion is necessary is registered for each of the division areas; and the processor that:
sequentially executes the overwrite deletion for the division areas for which the deletion management information indicates that the overwrite deletion is necessary, and changes the deletion management information for the division areas for which the overwrite deletion is finished to a non-necessity of the overwrite deletion;
requests the file system to use the memory, and executes a job by using the division areas assigned by the file system; and
changes the deletion management information for the division areas for which the division area management information is changed so as to change the status to "in use" by the file system, to the non-necessity of the overwrite deletion, and changes the deletion management information for the division areas to be released by a releasing request, to a necessity of the overwrite deletion in case that the file system receives the releasing request, the releasing request changing the status of the division area from "in use" to "unused",
wherein in case that the processor receives the releasing request, the processor changes the division area management information for the division areas to be released by the releasing request so as to change the status to "unused" before the deletion management information for all of the division areas to be released by the releasing request is changed to the non-necessity of the overwrite deletion.

2. The job execution device of claim 1, wherein the processor further interrupts the overwrite deletion when the job is executed.

3. The job execution device of claim 2,
wherein in case that the file system changes the division area management information, the processor stores changed contents of the division area management information, and
when the interrupted overwrite deletion is restarted, the processor changes the deletion management information for the division areas for which the division area management information is changed so as to change the status to "in use" by the file system, to the non-necessity of the overwrite deletion in accordance with the changed contents, and changes the deletion management information for the division areas for which the division area management information is changed so as to change the status from "in use" to "unused" by the file system, to the necessity of the overwrite deletion in accordance with the changed contents.

4. The job execution device of claim 2, wherein
every when the overwrite deletion for each division area is finished, the processor determines whether the job is executed and
during execution of the overwrite deletion for one division area, the processor sets the division area management information for the one division area to "in use".

5. The job execution device of claim 1, wherein
the memory is divided into a plurality of partitions,
a priority order is assigned to each of the partitions, and
the processor executes the overwrite deletion preferentially for the division areas included in the partition having a high priority order.

6. The job execution device of claim 5, wherein
each partition is related to a function which is used by the job execution device,
in case that the function is used, the partition which is related to the function is used and a usage frequency of the partition is stored, and
the priority order is determined according to the usage frequency.

7. The job execution device of claim 1, further comprising:
an authentication device that judges a user who uses the job execution device,
wherein the deletion management information indicating the necessity of the overwrite deletion includes a priority order corresponding to the user who uses the job execution device when a data is written in the division area, and
the processor executes the overwrite deletion preferentially for the division area for which the deletion management information has a higher priority order.

8. The job execution device of claim 1, wherein
the job execution device has a normal mode and a security mode having a higher security for data stored in the memory than the normal mode, as an operation mode of the job execution device, and
the processor executes the overwrite deletion in the security mode.

9. A non-transitory computer-readable recording medium storing a program, wherein the program causes an information processing apparatus, which includes a memory in which a storing area of the memory is divided into a plurality of division areas, a file system stored in the memory that, when executed by a processor coupled with the memory, manages the storing area of the memory by using a file allocation table in which division area management information that indicates a status of each of the division areas as in use or unused is registered, and the processor that requests the file system to use the memory and executes a job by using the division areas assigned by the file system, to:
prepare a management table in which deletion management information indicating whether the overwrite deletion is necessary is registered for each of the division areas;
sequentially execute the overwrite deletion for the division areas for which the deletion management information indicates that the overwrite deletion is necessary, and changing the deletion management information for the division areas for which the overwrite deletion is finished, to a non-necessity of the overwrite deletion;
change the deletion management information for the division areas for which the division area management information is changed so as to change the status to "in use", to the non-necessity of the overwrite deletion, and changing the deletion management information for the division areas to be released by a releasing request, to a necessity of the overwrite deletion in case that the file system receives the releasing request, the releasing request changing the status of the division area from "in use" to "unused"; and
change the division area management information for the division areas to be released by the releasing request so as to change the status to "unused" before the deletion management information for all of the division areas to be released by the releasing request is changed to the non-necessity of the overwrite deletion in case that the file system receives the releasing request.

10. A data deletion method for executing an overwrite deletion for a storing unit in a job execution device in which a storing area of the storing unit is divided into a plurality of division areas and a file system manages the storing area of the storing unit by using a file allocation table in which division area management information indicating a status of each of the division areas is registered, the status indicating that each division area is in use or unused, and which requests the file system to use the storing unit and executes a job by using the division areas assigned by the file system, the method comprising:

preparing a management table in which deletion management information indicating whether the overwrite deletion is necessary is registered for each of the division areas;

sequentially executing the overwrite deletion for the division areas for which the deletion management information indicates that the overwrite deletion is necessary, and changing the deletion management information for the division areas for which the overwrite deletion is finished, to a non-necessity of the overwrite deletion;

changing the deletion management information for the division areas for which the division area management information is changed so as to change the status to "in use", to the non-necessity of the overwrite deletion, and changing the deletion management information for the division areas to be released by a releasing request, to a necessity of the overwrite deletion in case that the file system receives the releasing request, the releasing request changing the status of the division area from "in use" to "unused"; and changing the division area management information for the division areas to be released by the releasing request so as to change the status to "unused" before the deletion management information for all of the division areas to be released by the releasing request is changed to the non-necessity of the overwrite deletion in case that the file system receives the releasing request.

11. The data deletion method of claim 10, wherein when the job is executed, the overwrite deletion is interrupted.

12. The data deletion method of claim 11, wherein in the changing of the deletion management information, in case that the file system changes the division area management information, changed contents of the division area management information are stored, when the interrupted overwrite deletion is restarted, the deletion management information for the division areas for which the division area management information is changed so as to change the status to "in use" by the file system, is changed to the non-necessity of the overwrite deletion in accordance with the changed contents, and the deletion management information for the division areas for which the division area management information is changed so as to change the status from "in use" to "unused" by the file system is changed to the necessity of the overwrite deletion in accordance with the changed contents.

13. The data deletion method of claim 11, wherein every when the overwrite deletion for each division area is finished, it is determined whether the job is executed, and in the executing of the overwrite deletion, during execution of the overwrite deletion for one division area, the division area management information for the one division area is set to "in use".

14. The data deletion method of claim 10, further comprising:

setting a plurality of partitions in the storing area of the storing unit; and assigning a priority order to each of the partitions, wherein in the executing of the overwrite deletion, the overwrite deletion is executed preferentially for the division areas included in the partition having a high priority order.

15. The data deletion method of claim 14, wherein in the setting of the plurality of partitions, each partition is related to a function which is used by the job execution device, and the data deletion method further comprises:

assigning the division areas of the partition which is related to the function, to the storing area to be used for executing the function by the job execution device; and storing a usage frequency of the partition, wherein in the assigning of the priority order, the priority order is determined according to the usage frequency.

16. The data deletion method of claim 10, further comprising:

judging a user who uses the job execution device; and registering a priority order corresponding to the user who uses the job execution device when a data is written in the division area, in the deletion management information for the division area in which the data is written, wherein in the executing of the overwrite deletion, the overwrite deletion is executed preferentially for the division area for which the deletion management information has a higher priority order.

17. The data deletion method of claim 10, wherein the job execution device has a normal mode and a security mode having a higher security for data stored in the storing unit than the normal mode, as an operation mode of the job execution device, and in the executing of the overwrite deletion, the overwrite deletion is executed in the security mode.

* * * * *